(12) United States Patent
Vrcelj et al.

(10) Patent No.: US 8,175,123 B2
(45) Date of Patent: May 8, 2012

(54) COLLECTION WINDOW POSITIONING USING TIME TRACKING INFORMATION

(75) Inventors: Bojan Vrcelj, San Diego, CA (US);
Ashok Mantravadi, San Diego, CA (US); Fuyun Ling, San Diego, CA (US);
Rajiv Vijayan, San Diego, CA (US);
Michael Mao Wang, SanDiego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 560 days.

(21) Appl. No.: 11/371,837

(22) Filed: Mar. 8, 2006

(65) Prior Publication Data

US 2006/0245349 A1  Nov. 2, 2006

Related U.S. Application Data

(60) Provisional application No. 60/660,717, filed on Mar. 10, 2005.

(51) Int. Cl.
*H04J 3/08* (2006.01)
(52) U.S. Cl. ........................................ 370/510; 370/324
(58) Field of Classification Search .................. 370/324, 370/321, 319, 316, 315, 310, 345, 350
See application file for complete search history.

(56) References Cited

U.S. PATENT DOCUMENTS

| | | | |
|---|---|---|---|
| 5,323,422 A | 6/1994 | Ushirokawa | |
| 5,490,168 A | 2/1996 | Phillips et al. | |
| 5,555,247 A | 9/1996 | Matsuoka et al. | |
| 5,732,113 A | 3/1998 | Schmidl et al. | |
| 5,848,107 A | 12/1998 | Philips | 345/342 |
| 6,175,551 B1 | 1/2001 | Awater et al. | |
| 6,209,109 B1 | 3/2001 | Hori et al. | |

(Continued)

FOREIGN PATENT DOCUMENTS

EP  0915597  5/1999
(Continued)

OTHER PUBLICATIONS

Zafar Ali Khan, Low-Complexity ML Channel Estimation Schemes for OFDM,vol. 2, Nov. 16-18, 2005,Networks, 2005. Jointly held with the 2005 IEEE 7th Malaysia International Conference on Communication., 2005 13th IEEE International Conference on.*

(Continued)

*Primary Examiner* — Chi Pham
*Assistant Examiner* — Fan Ng
(74) *Attorney, Agent, or Firm* — Ryan Farr

(57) ABSTRACT

A method for positioning a collection window for a Fourier transform function is disclosed. A first orthogonal frequency division multiplexing (OFDM) symbol and a second OFDM symbol are received. The first OFDM symbol comprises a plurality of frequency division multiplexed (FDM) symbols. The first OFDM symbol is characterized by at least two of the following: a delay spread, a first arriving path (FAP), or a last arriving path (LAP). A channel location is estimated from a channel impulse response. A point relative to the channel location is selected. A beginning of the collection window is positioned for the second OFDM symbol at the selected point. Alternatively, a point is selected at a first location relative to the channel location using a first algorithm if a delay spread is less than a predetermined length. The selected point is chosen at a second location relative to the channel location using a second algorithm if the delay spread is greater than the predetermined length.

37 Claims, 16 Drawing Sheets

U.S. PATENT DOCUMENTS

| | | |
|---|---|---|
| 6,347,071 B1 | 2/2002 | Cupo et al. |
| 6,498,928 B1 | 12/2002 | Hiramatsu |
| 6,650,616 B2 | 11/2003 | Crawford |
| 6,724,834 B2 * | 4/2004 | Garrett et al. ............... 375/317 |
| 6,731,594 B1 | 5/2004 | Bohnke |
| 6,778,591 B2 | 8/2004 | Sato |
| 6,885,712 B1 | 4/2005 | Celebi |
| 6,993,083 B1 | 1/2006 | Shirakata et al. |
| 7,027,540 B2 | 4/2006 | Wilson et al. |
| 7,058,144 B2 | 6/2006 | Baldwin |
| 7,110,387 B1 | 9/2006 | Kim et al. |
| 7,123,669 B2 | 10/2006 | Ye et al. |
| 7,133,457 B2 | 11/2006 | Singh et al. |
| 7,177,376 B2 | 2/2007 | Atungsiri et al. |
| 7,203,894 B2 | 4/2007 | Pan et al. |
| 7,236,554 B2 | 6/2007 | Gupta |
| 7,254,196 B2 | 8/2007 | Kriedte et al. |
| 7,278,071 B2 | 10/2007 | Budde et al. |
| 7,372,889 B2 | 5/2008 | Atarashi et al. |
| 7,391,828 B2 * | 6/2008 | Liu et al. ...................... 375/342 |
| 7,411,983 B2 | 8/2008 | Jo et al. |
| 7,492,700 B2 | 2/2009 | Schmidt |
| 7,577,087 B2 | 8/2009 | Palin |
| 2002/0024991 A1 | 2/2002 | Levin et al. |
| 2002/0110202 A1 | 8/2002 | Wilson et al. |
| 2003/0026197 A1 * | 2/2003 | Crawford ...................... 370/203 |
| 2003/0043927 A1 | 3/2003 | Suzuki |
| 2003/0095611 A1 | 5/2003 | Budde et al. |
| 2004/0125742 A1 | 7/2004 | Schmidt |
| 2004/0146024 A1 | 7/2004 | Li et al. |
| 2005/0063298 A1 | 3/2005 | Ling et al. |
| 2005/0163258 A1 | 7/2005 | Gore et al. |
| 2005/0180533 A1 | 8/2005 | Hamman |
| 2005/0249181 A1 | 11/2005 | Vijayan et al. |
| 2006/0018413 A1 | 1/2006 | Gupta |
| 2006/0114815 A1 | 6/2006 | Hasegawa et al. |
| 2006/0141933 A1 | 6/2006 | Smee et al. |
| 2006/0205356 A1 | 9/2006 | Laroia et al. |
| 2006/0215539 A1 | 9/2006 | Vrcelj et al. |
| 2006/0221810 A1 | 10/2006 | Vrcelj et al. |
| 2006/0233097 A1 | 10/2006 | Vrcelj et al. |
| 2006/0233269 A1 | 10/2006 | Bhushan et al. |
| 2007/0053473 A1 | 3/2007 | Palin |
| 2007/0098125 A1 | 5/2007 | Vrcelj et al. |
| 2007/0140322 A1 | 6/2007 | Wang et al. |
| 2007/0211765 A1 | 9/2007 | Vrcelj et al. |
| 2008/0260008 A1 | 10/2008 | Vrcelj et al. |

FOREIGN PATENT DOCUMENTS

| | | |
|---|---|---|
| EP | 1178642 | 2/2002 |
| EP | 1320208 | 6/2003 |
| EP | 1 416 693 A2 | 6/2004 |
| GB | 2365714 | 2/2002 |
| GB | 2395094 A | 5/2004 |
| JP | 10135926 A | 5/1998 |
| JP | 10224318 A | 8/1998 |
| JP | 2001119368 A | 4/2001 |
| JP | 2001251273 A | 9/2001 |
| JP | 2002171238 | 6/2002 |
| JP | 2003510952 T | 3/2003 |
| JP | 2003110519 A | 4/2003 |
| JP | 2003518826 T | 6/2003 |
| JP | 2004-153831 | 5/2004 |
| JP | 2004343732 | 12/2004 |
| JP | 2005057575 A | 3/2005 |
| JP | 2005057673 | 3/2005 |
| JP | 2005527154 | 9/2005 |
| KR | 1020050010834 | 1/2005 |
| RU | 2235429 C1 | 8/2004 |
| TW | 321809 | 12/1997 |
| TW | 543329 | 7/2003 |
| TW | 560153 | 11/2003 |
| TW | 571543 | 1/2004 |
| WO | 9707620 | 2/1997 |
| WO | 00049782 | 8/2000 |
| WO | 00077961 | 12/2000 |
| WO | WO0147204 A1 | 6/2001 |
| WO | WO0233838 | 4/2002 |
| WO | 2005002164 | 1/2005 |
| WO | 2005022797 | 3/2005 |
| WO | 2005050865 | 6/2005 |
| WO | 2006099240 | 9/2006 |

OTHER PUBLICATIONS

International Search Report, PCT/US2006/008798, International Searching Authority, European Patent Office, Jun. 27, 2006.

Written Opinion, PCT/US2006/008798, International Searching Authority, European Patent Office, Jun. 27, 2006.

International Preliminary Report on Patentability, PCT/US2006/008798, the International Bureau of WIPO, Geneva, Switzerland, Sep. 12, 2007.

Zhou et al., "Real-Time ISI Free Window Tracking Scheme for OFDM System," Vehicular Technology Conference 2004, VTC2004-Fall, Sep. 26, 2004, pp. 4325-4329, 2004 IEEE 60th, Los Angeles, CA, Sep. 26-29, 2004, IEEE, Piscataway, NJ, USA, XP010790237.

Yamazaki, et al: "A Timing Synchronization Scheme for OFDM," Technical Report of the Institute of Electronics, Information, and Communication Engineers, Jun. 21, 2002, vol. 102, No. 150, pp. 55-60, RCS 2002-84.

* cited by examiner

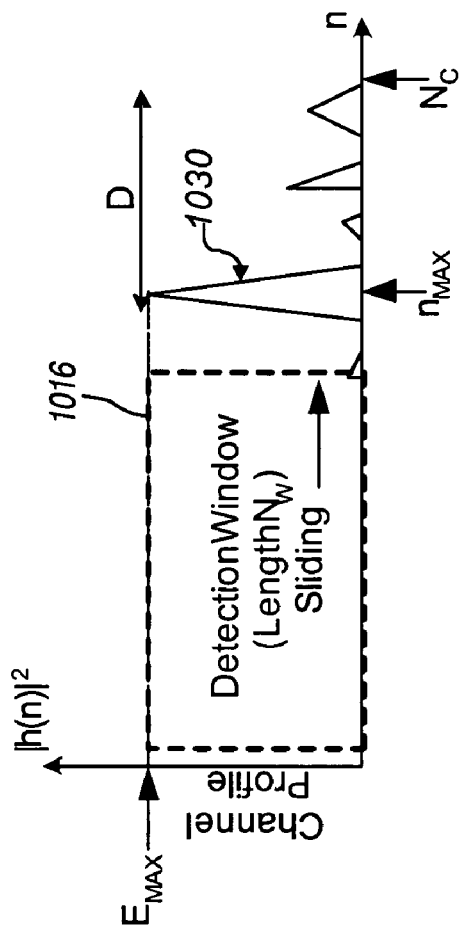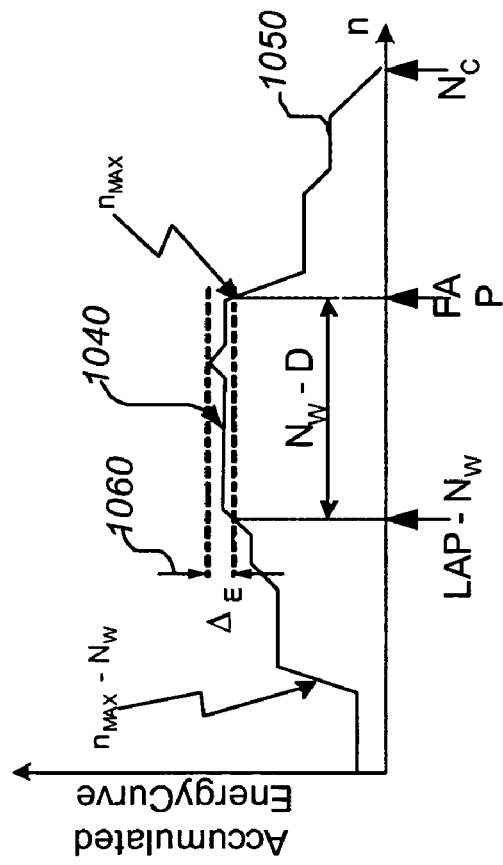
*FIG. 10A*
*FIG. 10B*

COLLECTION WINDOW POSITIONING USING TIME TRACKING INFORMATION

CROSS-REFERENCE TO RELATED APPLICATIONS

This application claims the benefit of and is a non-provisional of U.S. Provisional Application Ser. No. 60/660,717, filed on Mar. 10, 2005, which is assigned to the assignee hereof and hereby expressly incorporated by reference in its entirety for all purposes.

This application is related to U.S. patent application Ser. No. 11/371,536, filed on Mar. 8, 2006, entitled "TIME TRACKING FOR A COMMUNICATION SYSTEM"; and U.S. patent application Ser. No. 11/371,535, filed on Mar. 8, 2006, entitled "TREND INFLUENCED TIME TRACKING"; which are all assigned to the assignee hereof and hereby expressly incorporated by reference in each of their entirety for all purposes.

BACKGROUND

The present invention relates generally to data or voice communication, and more specifically to synchronization in a communication system.

Orthogonal frequency division multiplexing (OFDM) is a multi-carrier modulation technique that effectively partitions the overall system bandwidth into multiple (N) orthogonal frequency subbands. These subbands are also referred to as tones, sub-carriers, bins, and frequency channels. With OFDM, each subband is associated with a respective sub-carrier that may be modulated with data, pilots, or overhead information.

In an OFDM system, a transmitter processes data to obtain modulation symbols, and further performs processing on the modulation symbols to generate an OFDM symbol. The transmitter then conditions and transmits the OFDM symbol via a communication channel. The OFDM system may use a transmission structure whereby data is transmitted in frames, with each frame having a time duration. Different types of data (e.g., traffic/packet data, overhead/control data, pilot, and so on) may be sent in different parts of each frame. The term "pilot" generically refers to data and/or transmission that are known in advance by both the transmitter and a receiver.

The receiver typically needs to obtain accurate frame and OFDM symbol timing in order to properly recover the data sent by the transmitter. For example, the receiver may need to know the start of each frame in order to properly recover the different types of data sent in the frame. The receiver often does not know the time at which each OFDM symbol is sent by the transmitter nor the propagation delay introduced by the communication channel. The receiver would then need to ascertain the timing of each OFDM symbol received via the communication channel in order to properly perform the complementary OFDM demodulation on the received OFDM symbol.

Synchronization refers to a process performed by the receiver to obtain frame and OFDM symbol timing. The receiver may also perform other tasks, such as frequency error estimation and channel estimation. Synchronization can occur at different times to improve timing and correct for changes in the channel. Wireless systems can have their timing change coherently since abrupt changes in the channel are unlikely.

Often the channel experiences varying delay and multipath. Different reflections or paths of the signal can reach a receiver at different times and have different magnitudes. Fading affects the magnitude of the received signal. A delay spread is the difference between the first arriving path (FAP) and a last arriving path (LAP). The LAP may not be the last actual reflection that is received, but the last one that meets some time delay limit and/or magnitude criteria. If both FAP and LAP can be estimated correctly and the OFDM symbol timing is adjusted accordingly, then most of the received signal reflections can be constructively used for data demodulation.

SUMMARY

In an aspect, a method for placing a collection window for a Fourier transform function analyzing a multi-carrier communication signal is disclosed. In one step, a first orthogonal frequency division multiplexing (OFDM) symbol and second OFDM symbol are received. The first OFDM symbol comprise a plurality of frequency division multiplexed (FDM) symbols. The first OFDM symbol is characterized by comprised of a first arriving path (FAP) and a last arriving path (LAP). A channel impulse response is determined using the plurality of FDM symbols. A channel location is estimated from the channel impulse response. A point relative to the channel location is chosen, where the channel location is characterized by at least two of FAP, LAP or delay spread. A beginning of the collection window is placed for the second OFDM symbol at the point. The point is chosen at a first location relative to the channel location using a first algorithm if a delay spread is less than a predetermined length. Alternatively, the point is chosen at a second location relative to the channel location using a second algorithm if the delay spread is greater than the predetermined length. The first and second algorithms are different and the first and second locations are different.

In an aspect, a receiver for placing a collection window for a Fourier transform function analyzing a multi-carrier communication signal is disclosed. The receiver includes: means for receiving a first OFDM symbol and second OFDM symbol; means for determining a channel impulse response using the plurality of FDM symbols; means for estimating a channel location from the channel impulse response, wherein the channel location is characterized by at least two of delay spread, FAP or LAP; means for choosing a point relative to the channel location; and means for placing a beginning of the collection window for the second OFDM symbol at the point. The first OFDM symbol comprises a plurality of FDM symbols, and the first OFDM symbol is characterized by a FAP and a LAP. The point is chosen at a first location relative to the channel location using a first algorithm if a delay spread is less than a predetermined length. Alternatively, the point is chosen at a second location relative to the channel location using a second algorithm if the delay spread is greater than the predetermined length. The first and second algorithms are different, and the first and second locations are different.

In an aspect, a communication device for placing a collection window for a Fourier transform function analyzing a multi-carrier communication signal is disclosed. The communication device includes a processor and a memory coupled together. The processor is configured to: receive a first OFDM symbol and second OFDM symbol, wherein the first OFDM symbol is characterized by a FAP and a LAP; determine a channel impulse response using a plurality of FDM symbols from the first OFDM symbol; estimate a channel location from the channel impulse response, wherein the channel location is characterized by at least two of delay spread, FAP or LAP; choose a point relative to the channel location; and place a beginning of the collection window for the second OFDM symbol at the point. The point is chosen at a first location relative to the channel location using a first algorithm if a delay spread is less than a predetermined length. Alternatively, the point is chosen at a second location relative to the channel location using a second algorithm if the delay spread is greater than the predetermined length. The first and second algorithms are different, and the first and second locations are different.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures:

FIGS. 10A and 10B are diagrams that show processing of a channel profile to determine an accumulated energy curve;

Figure 1:
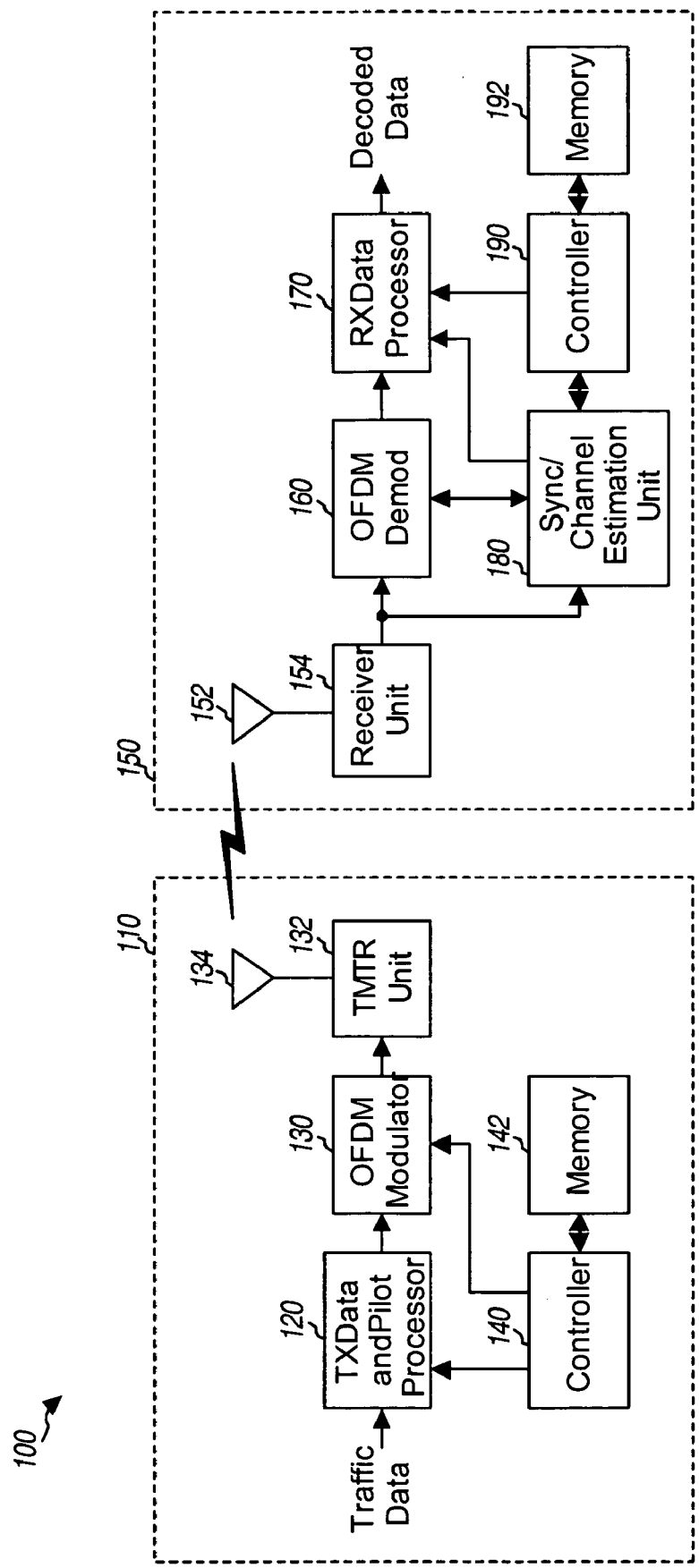
FIG. 1 is a block diagram of an embodiment of a base station and a wireless receiver in an orthogonal frequency division multiplexing (OFDM) system.

In the appended figures, similar components and/or features may have the same reference label.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage device, and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The synchronization techniques described herein may be used for various multi-carrier systems, for the downlink as well as the uplink and for broadcast systems. The downlink (or forward link) refers to the communication link from the base stations to the wireless receivers, and the uplink (or reverse link) refers to the communication link from the wireless receivers to the base stations. For clarity, these techniques are described below for the downlink in an orthogonal frequency division multiplexing (OFDM) or orthogonal frequency division multiple access (OFDMA) system. The pilot detection structure is well suited for a broadcast system but may also be used for non-broadcast systems. In a broadcast topology, the forward link would be transmitted by a single base station and received by a number of wireless receivers. In one embodiment, the forward link may have some channels intended for a single wireless receiver, a subset of the wireless receivers or all wireless receivers.

An improved method and system for timing synchronization after the initial acquisition in an OFDM system are disclosed. Fine timing acquisition (FTA) may precede performance of the data mode time tracking (DMTT) described in this disclosure. The result of the initial time acquisition, based on time division multiplexed (TDM) pilot 1 processing, is a coarse timing estimate. The course timing estimate provides the information about the beginning of a superframe, and gives a coarse estimate of the beginning of the TDM pilot 2. With further timing estimation using the TDM pilot 2 structure, the receiver estimates a more precise starting position of the subsequent OFDM symbols. This step is called FTA.

Once the FTA is done, ongoing timing correction in the DMTT mode keeps the receiver synchronized even though the channel may fade temporarily, experience wide delay spread, see newly appearing clusters of energy or other problems. The DMTT can use TDM or frequency division multiplexed (FDM) pilots, but the below description primarily relates to FDM pilots even though applicable to TDM pilots. Synchronization involves more than detecting the first arriving path (FAP) for the channel, but also includes finding the best position for a FFT collection window to capture the most useful energy from the channel. In one embodiment, this process is designed to successfully handle the channel estimates of 1024 samples with delay spreads of up to 768 chips.

In one embodiment, DMTT corrections depend on both the FAP location, as well as the estimated delay spread of the channel, D. A time tracker unit first finds the place $T_M$ where the maximum accumulated energy occurs, and stores this maximum value $E_M$. Next, accumulated energy curve to the left and to the right of $T_M$ is examined in an effort to locate positions where the accumulated energy drops below the value $(1-b) E_M$, for some pre-determined value b, less than one. In other words, the leading edge and the trailing edge of a flat zone in the accumulated energy curve is defined where the accumulated energy falls some percentage (e.g., 5% or 3%) away of its maximum over a detection window. The percentage defines a band around a maximum of the accumulated energy curve. Entering the band defines the leading edge of the flat portion in the band, $T_L$, while leaving the band defines the trailing edge of the flat portion in the band, $T_T$. The trailing edge coincides with the position of the FAP, while the leading edge is equal to the last arriving path (LAP) minus $N_W$. The difference between the leading edge and the trailing edge is equal to $N_W$ minus the delay spread, D. Therefore, delay spread D can be computed as $D=N_W-T_T-T_L$. Once at least two of FAP, LAP or D has been computed, DMTT is performed along with placement of the FFT collection window.

Referring first to FIG. 1, a block diagram of an embodiment of a base station 110 and a wireless receiver 150 in an OFDM system 100 is shown. The base station 110 is generally a fixed station and may also be referred to as a base transceiver system (BTS), an access point, or by some other term. Wireless receiver 150 may be fixed or mobile and may also be referred to as a user terminal, a mobile station, or by some other term. The wireless receiver 150 may also be a portable unit such as a cellular phone, a handheld device, a wireless module, a personal digital assistant (PDA), a television receiver, and so on.

At the base station 110, a TX data and pilot processor 120 receives different types of data (e.g., traffic/packet data and overhead/control data) and processes (e.g., encodes, interleaves, and maps modulation symbols) the received data to generate data symbols. As used herein, a "data symbol" is a modulation symbol for data, a "pilot symbol" is a modulation symbol for a pilot, and a modulation symbol is a complex value for a point in a signal constellation for a modulation scheme (e.g., M-PSK, M-QAM, and so on). The pilot processor 120 also processes pilot data to generate pilot symbols and provides the data and pilot symbols to an OFDM modulator 130.

OFDM modulator 130 multiplexes the data and pilot symbols onto the proper subbands and symbol periods and further performs OFDM modulation on the multiplexed modulation symbols to generate an OFDM symbol, as described below. In this embodiment, one OFDM symbol is formed with 4096 modulation symbols in the frequency domain, where there is one subcarrier for each modulation symbol. A transmitter (TMTR) unit 132 converts the OFDM symbols into one or more analog signals and further conditions (e.g., amplifies, filters, frequency upconverts, etc.) the analog signal(s) to generate a modulated signal. Base station 110 then transmits the modulated signal from an antenna 134 to wireless receivers in the OFDM system 100. In the time domain for this embodiment, each OFDM symbol period is 4096+512+17=4625 samples long.

At the wireless receiver 150, the transmitted signal from base station 110 is received by an antenna 152 and provided to a receiver unit 154. The receiver unit 154 conditions (e.g., filters, amplifies, frequency downconverts, etc.) the received signal and digitizes the conditioned signal to obtain a stream of input samples. An OFDM demodulator 160 performs OFDM demodulation on the input samples to obtain received data and pilot symbols. OFDM demodulator 160 also performs detection (e.g., matched filtering) on the received data symbols with a channel estimate (e.g., a frequency response estimate) to obtain detected data symbols, which are estimates of the data symbols sent by base station 110. OFDM demodulator 160 provides the detected data symbols to a receive (RX) data processor 170.

A synchronization/channel estimation unit (SCEU) 180 receives the input samples from receiver unit 154 and performs synchronization to determine frame and OFDM symbol timing, as described below. The SCEU 180 also derives the channel estimate using received pilot symbols from OFDM demodulator 160. The SCEU 180 provides the OFDM symbol timing and channel estimate to OFDM demodulator 160 and may provide the frame timing to RX data processor 170 and/or a controller 190. The OFDM demodulator 160 uses the OFDM symbol timing to perform OFDM demodulation and uses the channel estimate to perform detection on the received data symbols.

RX data processor 170 processes (e.g., symbol demaps, deinterleaves, decodes, etc.) the detected data symbols from OFDM demodulator 160 and provides decoded data. RX data processor 170 and/or controller 190 may use the frame timing to recover different types of data sent by base station 110. In general, the processing by OFDM demodulator 160 and RX data processor 170 is complementary to the processing by OFDM modulator 130 and TX data and pilot processor 120, respectively, at base station 110.

Controllers 140, 190 direct operation at base station 110 and wireless receiver 150, respectively. The controllers could be processors and/or state machines. Memory units 142, 192 provide storage for program codes and data used by controllers 140 and 190, respectively. The memory units 142, 192 could use various types of storage medium to store information.

The base station 110 may send a point-to-point transmission to a single wireless receiver, a multi-cast transmission to a group of wireless receivers, a broadcast transmission to all wireless receivers under its coverage area, or any combination thereof. For example, base station 110 may broadcast pilot and overhead/control data to all wireless receivers under its coverage area. Base station 110 may further single-cast transmit user-specific data to specific wireless receivers, multi-cast data to a group of wireless receivers, and/or broadcast data to all wireless receivers in various situations and embodiments.

Figures 2A, 2B:
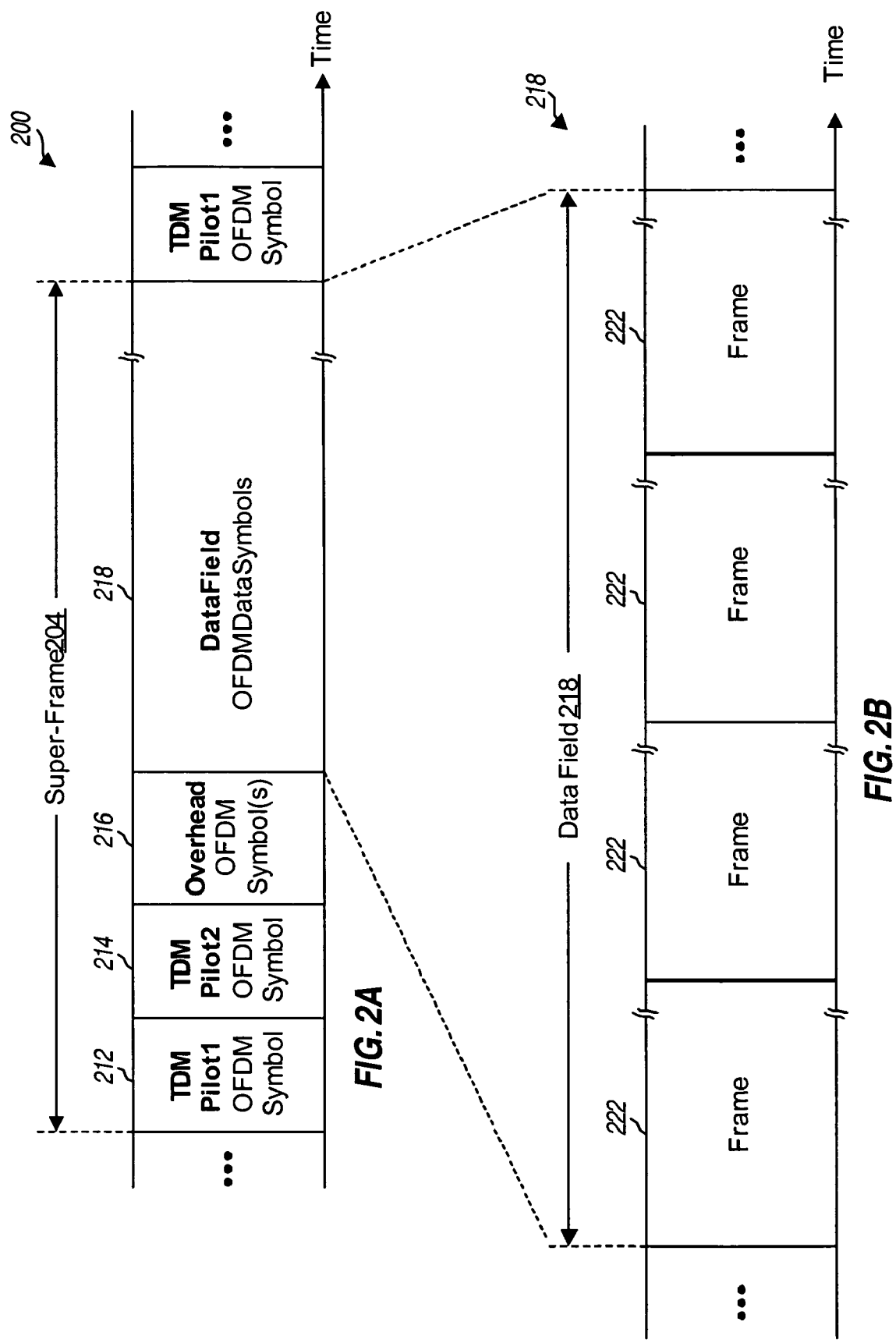
FIGS. 2A, 2B and 2C are block diagrams of an embodiment of a super-frame structure with increasing levels of detail.
Figure 2C:
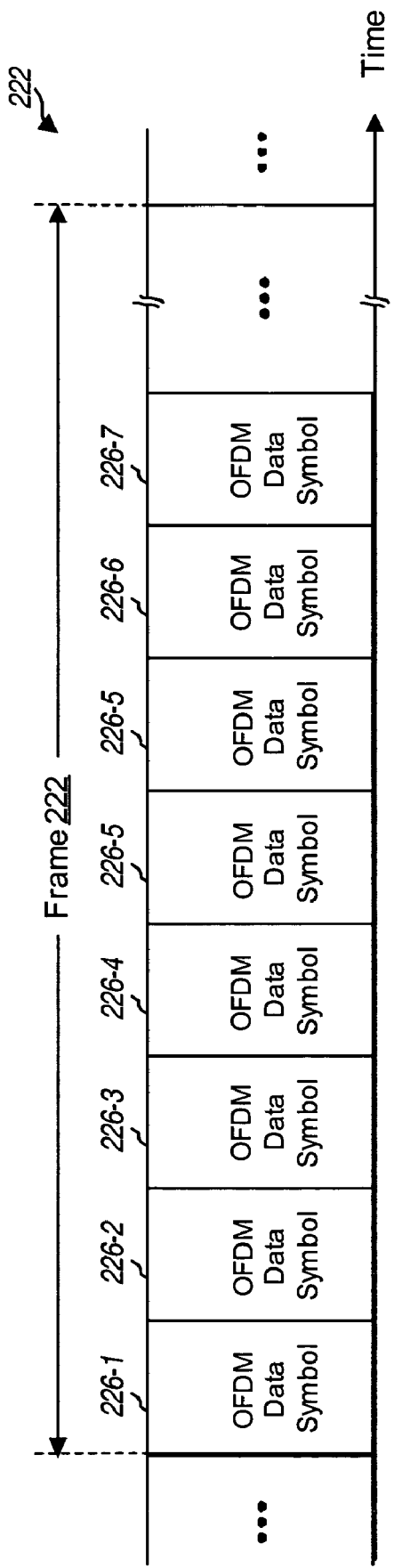

With reference to FIGS. 2A, 2B and 2C, an embodiment of a super-frame structure 200 that may be used for OFDM system 100 is shown. Data and pilot may be transmitted in super-frames 204, with each super-frame 204 having a predetermined time duration. A super-frame 204 may also be referred to as a frame, a time slot, or some other terminology. In this embodiment, each super-frame 204 includes a TDM pilot 1 field 212 for a first TDM pilot, a TDM pilot 2 field 214 for a second TDM pilot, an overhead field 216 for overhead/control data, and a data field 218 for traffic/packet data.

The four fields 212, 214, 216, 218 hold the data for each super-frame 204. Various allocation schemes can be used, for example, burst-TDM, cycled TDM, and/or burst-TDM/FDM. In one embodiment, the four fields 212, 214, 216, 218 are also arranged to facilitate synchronization and data recovery. Pilot TDM symbols 212, 214, that are transmitted first in each super-frame 204, may be used for detection of overhead OFDM symbols in the overhead field 216 that are transmitted next in the super-frame 204. Additionally, the TDM pilot fields 212, 214 are used for timing acquisition of the OFDM signal. Overhead information obtained from overhead field 216 may then be used for recovery of traffic/packet data sent in data field 218 that is transmitted last in the super-frame 204.

In an embodiment, TDM pilot 1 field 212 carries one OFDM symbol for TDM pilot 1, and TDM pilot 2 field 214 carries one OFDM symbol for TDM pilot 2. In general, each field may be of any duration, and the fields may be arranged in any order. In some embodiments, the TDM pilot 1 212 and/or TDM pilot 2 214 can be broadcast periodically in each super-frame 204 to facilitate synchronization by the wireless receivers.

The OFDM system 100 has an overall system bandwidth of BW MHz, which is partitioned into N orthogonal subbands using OFDM. The spacing between adjacent subbands is BW/N MHz. Of the N total subbands, M subbands may be used for pilot and data transmission, where M<N, and the remaining N−M subbands may be unused and serve as guard subbands. In an embodiment, the OFDM system 100 uses an OFDM structure with N=4096 total subbands, M=4000 usable subbands, and N−M=96 guard subbands. Additionally, FDM pilots symbols are interleaved in each OFDM symbol 226, for example, every eighth subband would punctuate data symbols with a FDM pilot symbol such that there are 500 FDM pilot symbols and 3500 data symbols available outside the guard subbands. In general, any OFDM structure with any number of total, usable, and guard subbands may be used for the OFDM system 100.

The data field 218 includes a number of frames 222, which are detailed in FIG. 2B. In this embodiment, there are four frames 222 in each data field 218, but different embodiments could use more or less frames. Each frame 222 includes a number of OFDM data symbols 226 as shown in FIG. 2C. In one embodiment, each OFDM data symbol 226 includes 3500 data symbols after accounting for unused guard subbands and removed FDM pilot symbols.

Among other things, TDM pilot 1 212 and TDM pilot 2 214 are designed to facilitate synchronization by the wireless receivers 150 in the OFDM system 100. A wireless receiver may use TDM pilot 1 212 to detect the start of each frame, obtain a coarse estimate of OFDM symbol timing, and estimate frequency error. The wireless receiver may use TDM pilot 2 214 to obtain more accurate or fine timing acquisition. The FDM pilot symbols interleaved within the data symbols can further allow synchronizing timing to optimize capture of the signal energy. Specifically, the FDM pilot can be used for channel estimation, and channel estimations can be used to optimize capture of the signal energy and ultimately re-adjust OFDM symbol timing.

Figure 3:
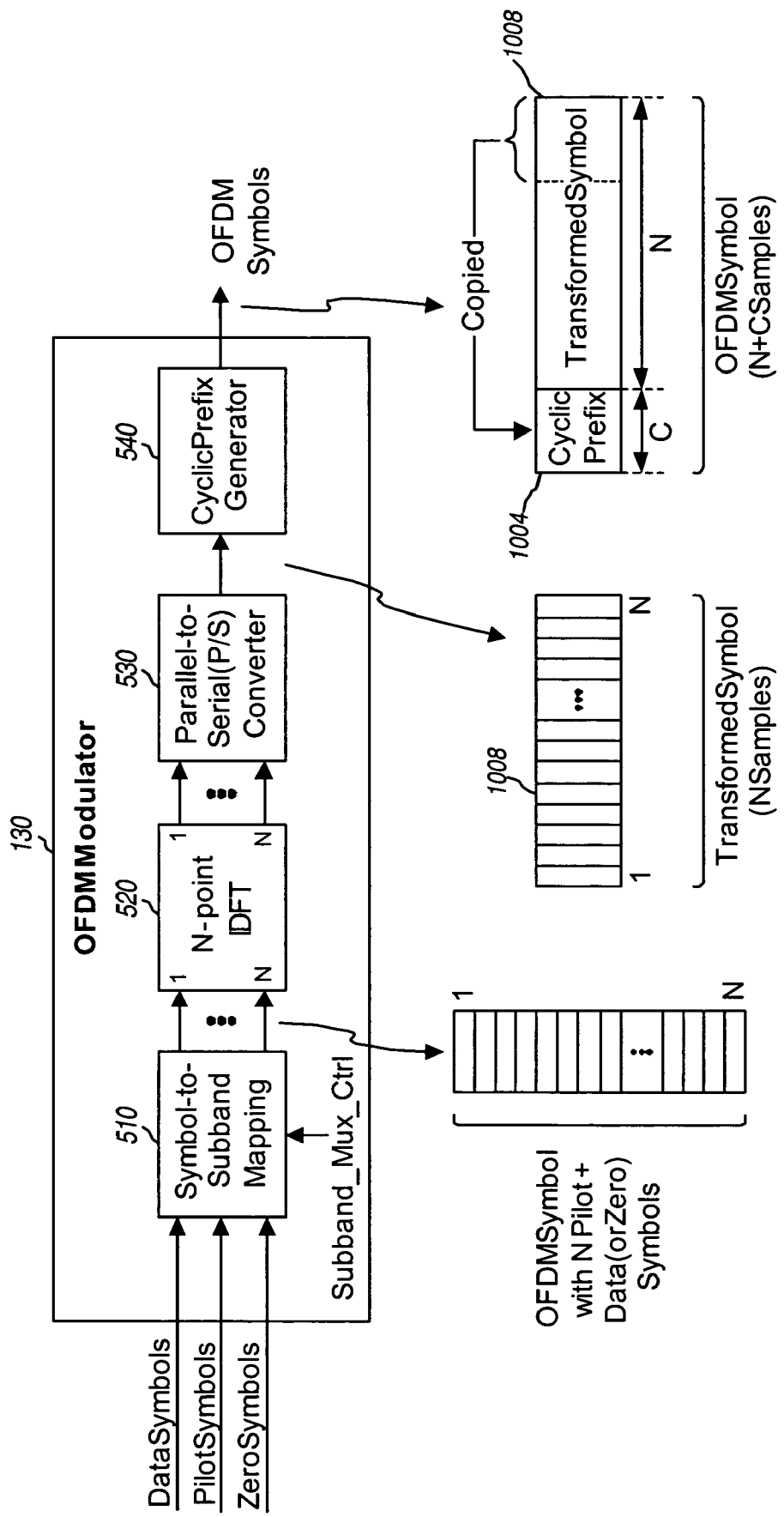
FIG. 3 is a block diagram of an embodiment of an OFDM modulator.

Referring next to FIG. 3, one embodiment of a block diagram of an embodiment of OFDM modulator 130 of the base station 110 is shown. A symbol-to-subband mapping or multiplexer unit 510 receives the data and pilot symbols from TX data and pilot processor 120 and maps these symbols onto the proper subbands based on a Subband_Mux_Ctrl signal from the controller 140. In each OFDM symbol period, the symbol-to-subband mapping unit 510 provides one data or pilot symbol on each subband used for data or pilot transmission and a "zero symbol" (which is a signal value of zero) for each unused subband. For each OFDM symbol period, symbol-to-subband mapping unit 510 provides N modulation symbols for the N total subbands, where each modulation symbol may be a data symbol, a pilot symbol, or a zero symbol.

A N-point inverse discrete Fourier transform (IDFT) unit 520 receives the N modulation symbols for each OFDM symbol period, transforms the N modulation symbols to the time domain with an N-point IDFT, and provides a "transformed" symbol that contains N time-domain samples. Each sample is a complex value to be sent in one sample period. An N-point inverse fast Fourier transform (IFFT) may also be performed in place of an N-point IDFT if N is a power of two, which is typically the case.

A parallel-to-serial (P/S) converter 530 serializes the N samples for each transformed symbol. A cyclic prefix generator 540 then repeats a portion (or C samples) of each transformed symbol to form an OFDM symbol that contains N+C samples. For example, the cyclic prefix 1004 is the last 512 samples of the OFDM symbol in one embodiment. The cyclic prefix is used to combat inter-symbol interference (ISI) and intercarrier interference (ICI), for example, caused by a long delay spread in the communication channel. Generally, delay spread is the time difference between the FAP and the LAP of the signal at a receiver 150. An OFDM symbol period (or simply, a "symbol period") is the duration of one OFDM symbol and is equal to N+C sample periods. In one embodiment, N=4096 and C=512 such that the symbol period is 4608. Some embodiments may have an inter-symbol guard band of 17 sample periods between OFDM symbols such that the OFDM symbol period is 4625.

Figure 4:
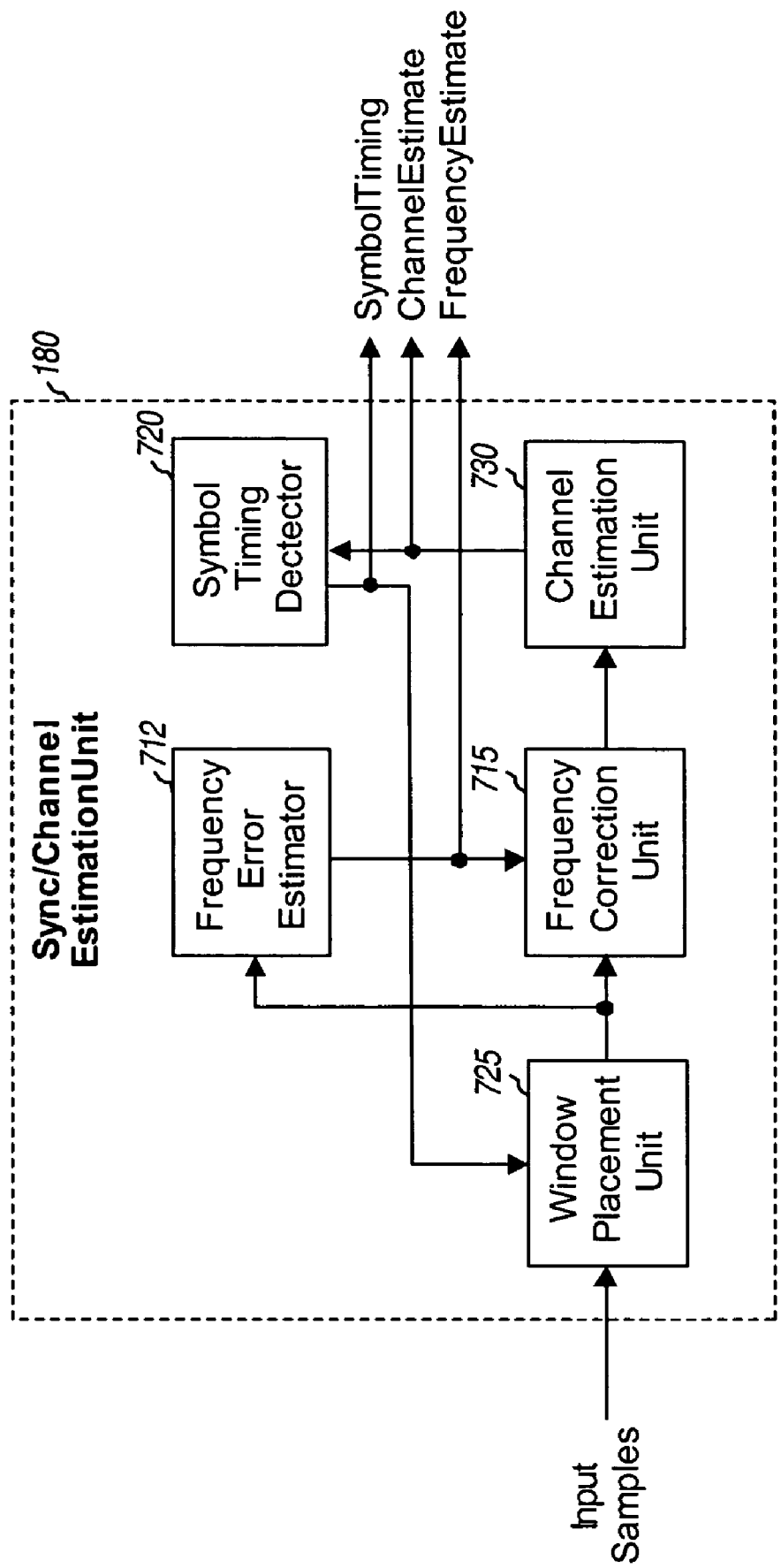
FIG. 4 is a block diagram of an embodiment of a synchronization and channel estimation unit.

Referring next to FIG. 4, one embodiment of a block diagram of the SCEU 180 for the wireless receiver 150 is shown. In the depicted embodiment, the SCEU 108 is operating in the time-tracking (or data mode) DMTT state. Within the SCEU 180, a window placement unit 725 aligns the samples according to the OFDM symbol timing corrections and eliminates the redundant CP 1004 from the OFDM symbol using symbol timing information from a symbol timing detector 720 or DMTT unit. In this embodiment, the OFDM symbol is represented by 4096 samples after the window placement unit 725. The relevant 4096 samples from the OFDM symbol are found in the FFT window placement unit 725 and sent to a N-point DFT unit to create the transformed OFDM symbol at the receiver using the relevant 4096 samples.

A frequency error estimator 712 receives the screened input samples and determines a frequency error estimate in the received signal. The frequency estimate is provided to a frequency correction unit 715 to perform the frequency correction. This frequency error may be due to various sources such as, for example, a difference in the frequencies of the oscillators at the base station and wireless receiver, Doppler shift, and so on. Screened and frequency-corrected input samples are produced by the frequency correction unit 715 using the frequency estimate. A channel estimation unit 730 receives and derives the channel estimate from the FDM pilots in the transformed symbol.

The channel estimate is primarily used to assist in data demodulation, but is also used to determine symbol timing for future OFDM symbols. The symbol timing detector 720 determines the symbol timing from the channel estimate and provides timing information to the window placement unit 725. In an iterative manner, the window placement is affected by prior channel estimates.

Figure 5:
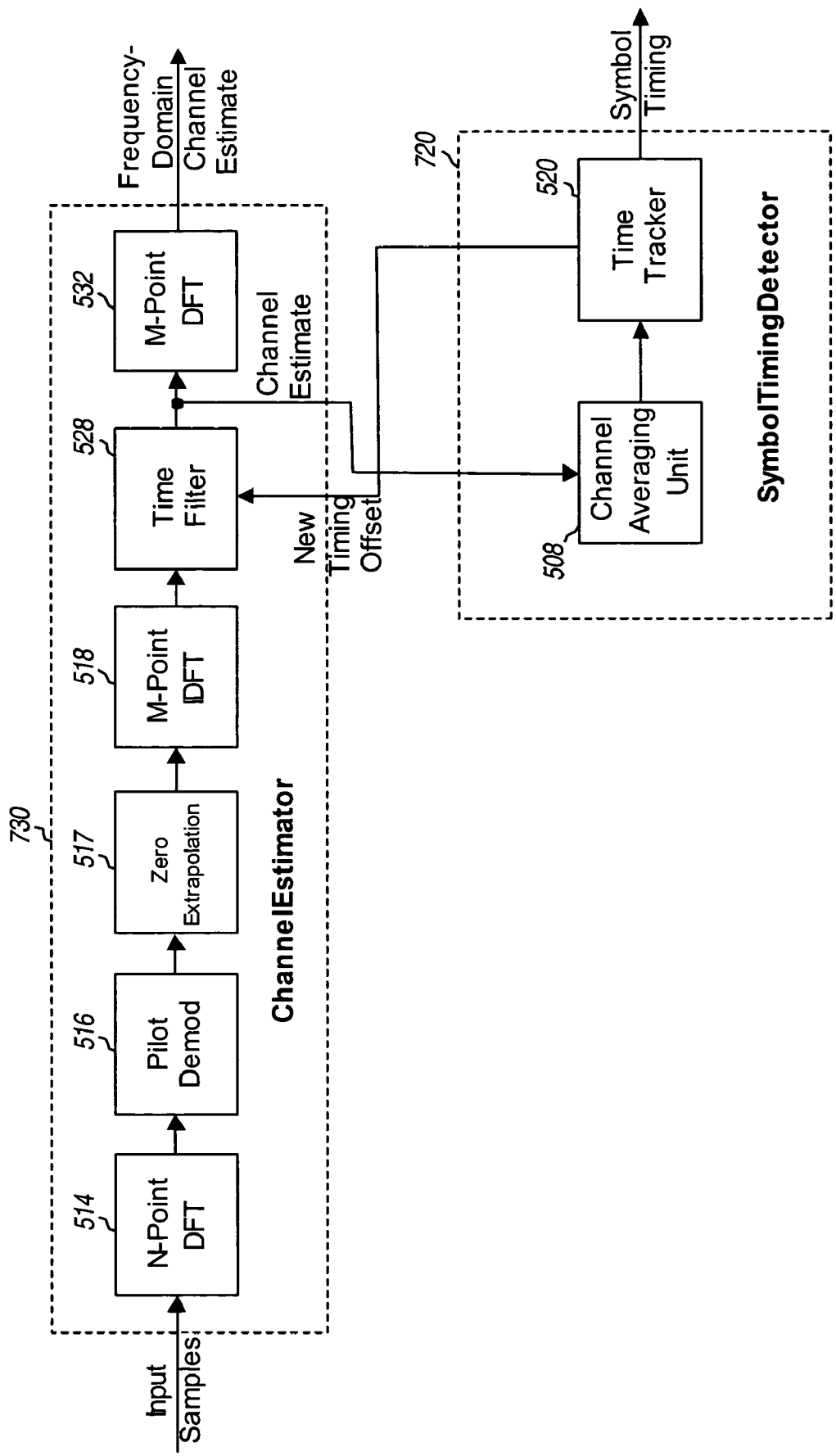
FIG. 5 is a block diagram of an embodiment of an OFDM symbol timing detector and channel estimator.

With reference to FIG. 5, a block diagram of an embodiment of symbol timing detector 720 and channel estimator 730 is shown coupled together for one embodiment that performs timing synchronization and channel estimation based on the FDM pilots. The channel estimator 730 produces both time- and frequency-domain channel estimations based upon the FDM pilots. The time-domain channel estimates are used by the symbol timing detector 720 in producing a new timing offset that is fed back to the channel estimation unit to affect capture of the next time-domain channel estimate. The timing offset is also used by the FFT window placement unit 725 as well as other circuits in the receiving unit 150. This loop allows iteratively determining the timing offset for use in various places throughout the receiving unit 150.

Channel estimator 730 produces a channel impulse response in time domain; namely, the channel estimator 730 is responsible for estimating the channel both in time and frequency domain from FDM pilots, using the time filter unit 528. The channel estimator 730 includes an N-point DFT 514, a pilot demodulator 516, a zero extrapolation unit 517, a M-point IDFT 518, a time filter 528, and an M-point DFT 532 in this embodiment. The N-point DFT 514 performs a 4096-point Fourier transform, for example, on the OFDM symbol after removal of the redundant information in the cyclic prefix by the FFT window placement unit 725. Even though the data symbols are used elsewhere after the N-point DFT 514, our discussion focuses on the 500 FDM pilots output from the DFT. The FDM pilots are demodulated in the pilot demod unit 516 to produce 500 demodulated FDM pilots. The zero extrapolation unit 517 converts the 500 actual pilots to 512 extrapolated FDM pilots. The M-point IDFT 518 uses a 512-point inverse Fourier transform to produce a time-domain channel observations based upon the 512 extrapolated FDM pilots. The time-domain channel observations could have aliasing.

The time filter 528 removes any possible aliasing by collecting channel observations over a number of consecutive OFDM symbols. This embodiment of the time filter 528 filters channel observations over three consecutive OFDM symbols, but other embodiments could perform averaging over more or less OFDM symbols. Through this process, three consecutive channel observation of length 512 samples are combined into a time-domain channel estimate of length 1024 samples in this embodiment. The timing offset is used to align the three consecutive channel observations.

Within symbol timing detector 720, a channel averaging unit 508 and a time tracker block 520 are used to determine symbol timing. The symbol timing detector 720 receives successive time-domain channel estimates, which are side-products of the channel estimation unit 730, and processes the time-domain channel estimates to track the signal and control production of future channel estimates by the channel estimator 730. The location of the channel energy is determined by a time tracker 520 based on analysis of the channel estimates produced with the FDM pilots.

Figure 6:
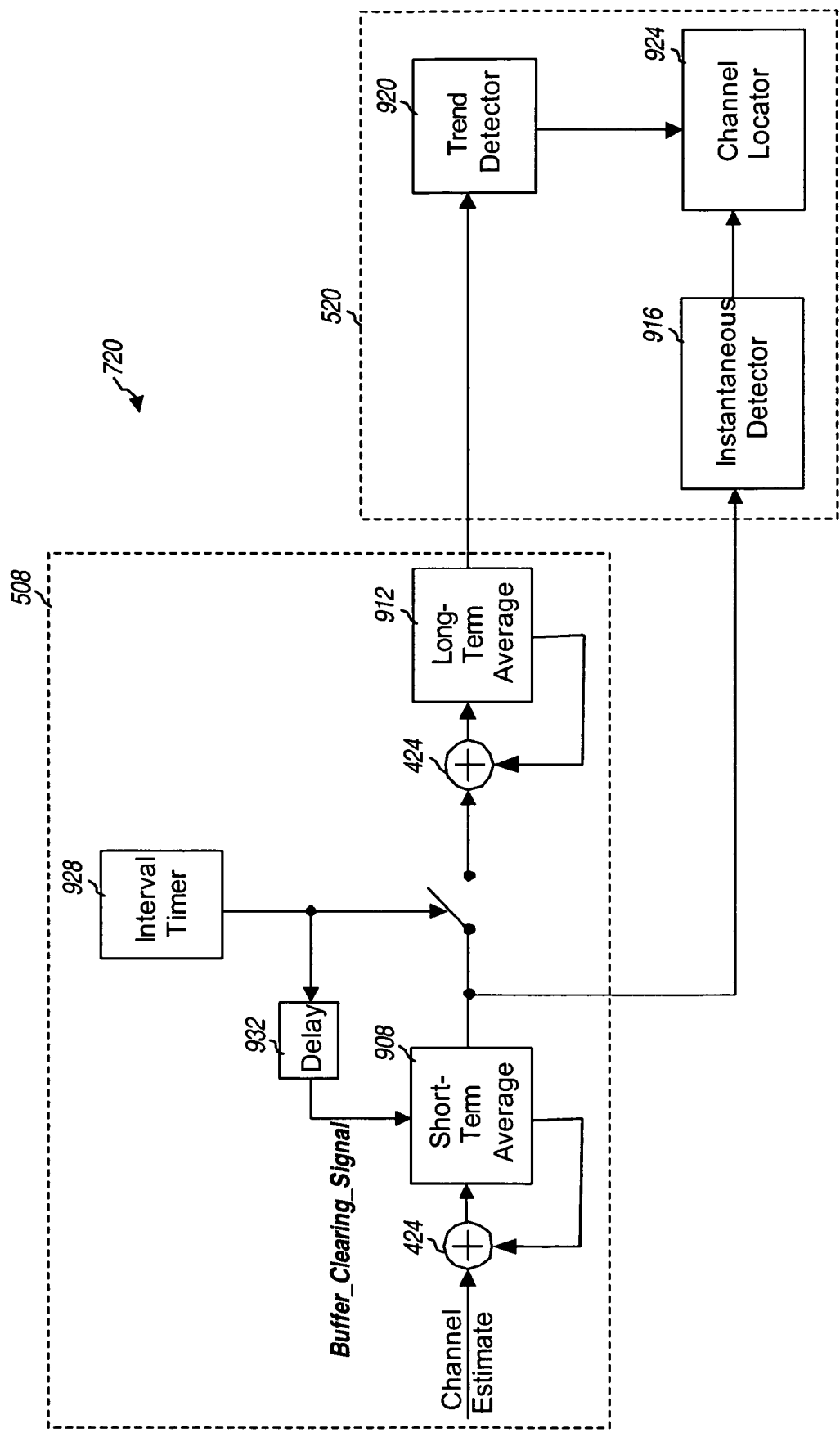
FIG. 6 is a block diagram of an embodiment of a symbol timing detector.

Referring next to FIG. 6, a block diagram of an embodiment of a symbol timing detector 720, which is used to help determine the location of the channel energy. This embodiment uses two levels of filtering, but other embodiments could only have one filter or even no filtering. The channel impulse response or time-domain channel estimate is sequentially received one tap at a time and filtered by a short-term average block 908. The short-term average uses the last few channel estimates to keep a short-term average of the channel estimate. Generally, the averaged channel impulse responses are within a one frame period. The short-term averaging process is periodically cleared after providing the short-term average to a long-term averaging block 912. In this embodiment, the short-term averaging block 912 helps to discriminate the useful channel information from the background noise to more accurately identify the channel taps and smooth the average channel impulse response used for further processing.

An interval timer 928 clears out the short-term average block 608 after a delay 632 that allows providing the result to the long-term average block 912 before clearing. The interval timer triggers after each frame 222 in one embodiment such that channel estimates over a one frame period are used in the short-term average block. During the clear operation, the output from the short-term average block is disconnected from a long-term average 912 by a switch. The period of the interval timer 928 is adjustable in some embodiments and could depend on the expected coherence time.

In this embodiment, the channel impulse response is 1024 taps long, but could be other sizes in other embodiments. Spurious channel estimates are filtered in the short-term average block 908 using a digital filter, for example, an infinite impulse response (IIR) is shown, but a finite impulse response (FIR) filter could alternatively be used in other embodiments. Filtering the channel tap energies one-by-one over time as in short-term average block 908 allows averaging the channel energy profile over time, and also helps enforce the significant portion of the channel versus background noise. The short-term averaged channel estimate is passed through an instantaneous detector to find an instantaneous FAP and LAP, which correspond to the channel profile over the past few OFDM symbols.

In another filtering step, a long-term average block 912 takes the short-term averaged channel estimate and filters it against historical channel estimates. These historical channel estimates are generally from channel profiles from several previous frames 222 (also across one or more superframes 204). In any event, the long-term average block 912 uses a broader range of channel estimates than the short-term average block 908. A FIR or IIR filter is used to combine the historical channel estimates with the current short-term averaged channel estimate. In one embodiment, the long-term average block is used to remember less frequent channel characteristics that have appeared in the past and are likely to appear in the future. The long-term averaged channel estimate is passed to a trend detector 920 to find the trends in FAP and LAP behavior.

A channel locator block 924 takes the instantaneous FAP and LAP and the trend FAP and LAP to determine an offset, Off, used in placing the FFT collection window in the window placement unit 725, as well as in aligning the channel observations in the time filter 528. The operation of the algorithms used in offset determination and application are further explained below.

Referring back to FIG. 5, the time tracker 520 may determine the FAP by searching for a decline in the peak of an accumulated energy curve 1050. The accumulation and peak detection may be achieved by sliding a "detection" window of length $N_W$ across the channel impulse response profile or "channel profile." At each detection window starting position, the energy of all taps falling within the detection window 1016 is computed to find the accumulated energy curve 1050. The accumulated energy curve 1050 is analyzed to determine a FAP and LAP by finding a leading and trailing edge of a plateau near the maximum of the accumulated energy curve 1050.

A plot of the accumulated energy in the channel taps at different detection window 1016 starting positions is shown below in FIG. 10B for an accumulated energy curve 1050 of one embodiment. The detection window 1016 is shifted to the right circularly so that when the right edge of the detection window 1016 reaches the last tap, the window 1016 wraps around to the first tap. Accumulated energy is thus collected for the same number of channel taps for each detection window 1016 starting position throughout the channel impulse response taps in the channel profile 1030.

Figure 7:
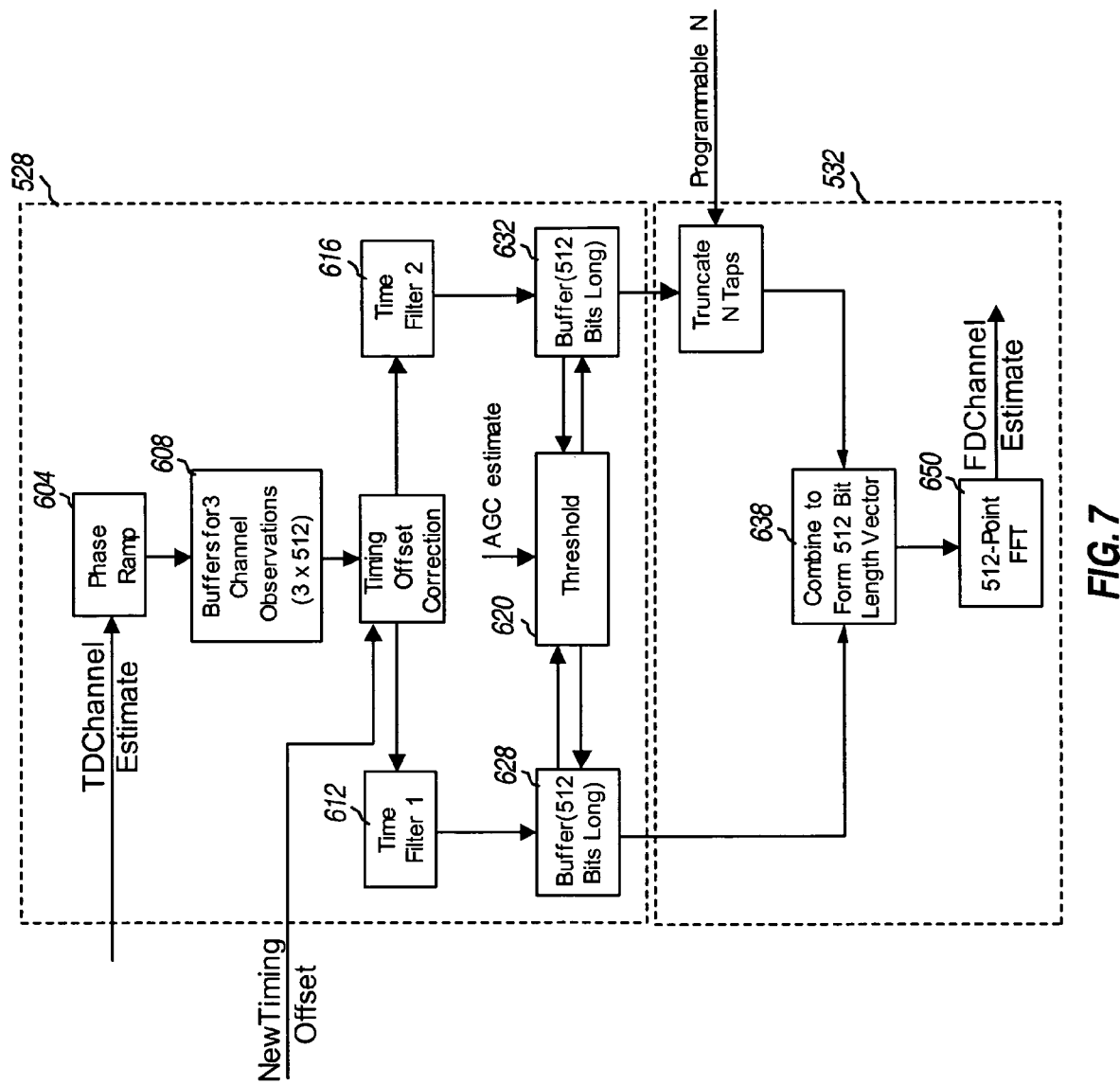
FIG. 7 is a block diagram of an embodiment of a time filter unit.

With reference to FIG. 7, a block diagram of an embodiment of a time filter unit 528 and an M-point DFT 532 is shown that details these blocks shown at a high level in FIG. 5. FIG. 7 shows the operations performed on the channel observations to obtain a 512-point channel estimate in the frequency-domain for the data interlace of interest.

In one embodiment, channel estimation is carried out based on the 500-FDM pilot subcarriers present in each OFDM symbol. The collected FDM pilots are processed in the N-point DFT unit 514, pilot demod unit 516, zero extrapolation and M-point IDFT units 517 and 518, respectively. A time-domain channel observation corresponding to a pilot interlace is thus obtained. FIG. 7 shows the operations performed for blocks 528 and 532 on the time-domain channel observation for obtaining the 512-point channel estimate in the frequency domain for the data interlace of interest for FDM carriers.

After a 512-point IFFT 518, a phase ramp 604 is performed to account for the offset of the pilot interlace from the zero interlace. The 512 time-domain channel observations obtained at the end of the phase ramp 604 are then filtered using two different time filters to result in a 1024-point channel estimate in time domain. This time-domain channel estimate of improved resolution is a side-product of channel estimation unit 730 and, at the same time, is the input to the symbol timing detector block 720.

Two different 3-tap non-causal time filters 612, 616 are used for the filtering operation. The filtering operation uses three additional 512 length buffers 608—two for storing the pilot observations corresponding to the previous and future OFDM symbols while the third buffer is used to store the extra 512 channel estimates obtained from the second time filter 616 employed. The result of the first time filter 612 operation is written back to the 512 length buffer containing the pilot observations corresponding to the oldest OFDM symbol while the result of the second time filter 616 operation is written to the extra 512 length buffer employed for this purpose. The exact time filtering operation depends on the symbol number, which determines the position of the pilot interlace.

In the process of combining the time-domain channel observations from three consecutive OFDM symbols, the time filtering unit 528 takes into account any timing offsets (or corrections) that are detected by the time tracking block 520. This is because once the timing corrections get applied to the FFT window placement unit 725, the corresponding time-domain channel observations are no longer aligned at the input of the time filter unit 528, and the alignment takes place in the time filtering unit 528. The timing offsets are applied to the buffers corresponding to the future and the past OFDM symbol observations, while the present OFDM symbol observation is assumed to have the correct timing. The offset is applied before combining the time domain channel observations using the time filtering unit 528.

We obtain an input from the time tracking block 520, which we shall refer to as newTimingOffset. We also maintain two registers, which we shall refer to as Offset1 and Offset2. Offset1 corresponds to the effective offset that is applied to the buffer corresponding to the future OFDM symbol (h(n+1)) while Offset2 corresponds to the offset that has to be applied to the buffer corresponding to the past OFDM symbol (h(n−1)).

Combining 638 is implemented to form a 512 length vector. This vector represents an equivalent 512-long time domain channel observation which corresponds to a different (non-pilot) interlace. Next, this vector is transformed into frequency domain using the 512-point FFT unit 650, and such equivalent frequency domain channel estimate is used in demodulating the data on the interlace in question.

As timing corrections are implemented, the time filter unit 528 transitions from one time base to a new time base as channel conditions change. The time base used for the FDM pilots of an OFDM symbol corresponds to that used for the data in that OFDM symbol. The time filter 528 generally combines the time-domain channel observations from three consecutive OFDM symbols (i.e., the past, present and future), but when transitioning, may only consider channel observations from those OFDM symbols on the same time base. Additionally, channel observations on another time base may be corrected to the current time base before use. In any event, only channel observations on the same time base or corrected to the same time base are used when the time filter considers consecutive OFDM symbols.

Figure 8:
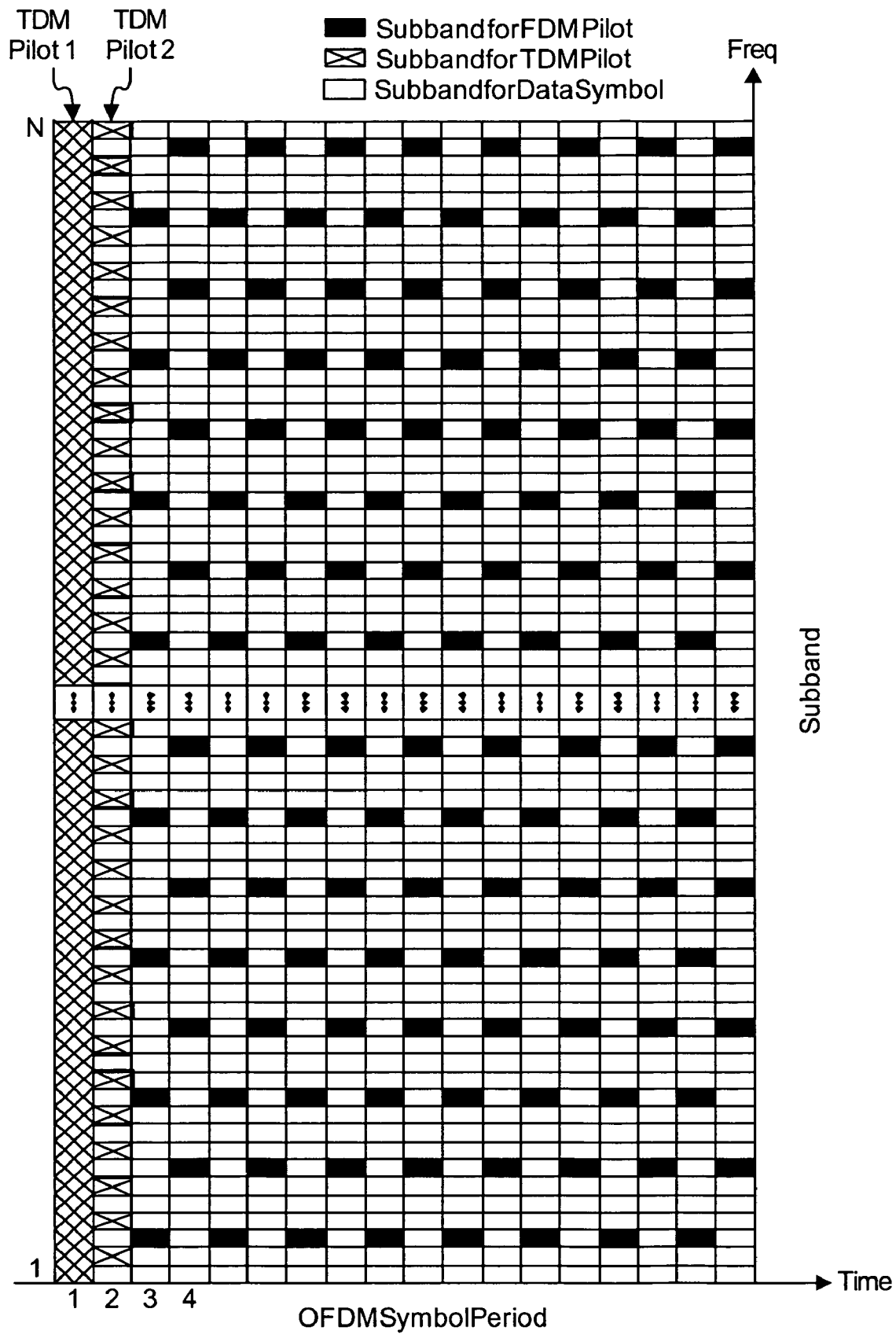
FIG. 8 is a diagram of an embodiment of a pilot transmission scheme with both TDM and FDM pilots.

With reference to FIG. 8, an embodiment of a pilot transmission scheme with a combination of TDM and FDM pilots is shown. The base station 110 may transmit TDM pilot 1 212 and TDM pilot 2 214 in each super-frame 204 to facilitate initial and fine timing acquisition by the wireless receivers 150. In this embodiment, the overhead for the TDM pilots 212, 214 is two OFDM symbol periods, which may be small compared to the size of the super-frame 204. The base station 110 may also transmit FDM pilots in most or some of the remaining subbands according to various schemes.

Each set for a OFDM symbol period contains a sufficient number of ($L_{fdm}$) subbands in a set to support channel estimation and frequency and time tracking by the wireless receivers. The set of subbands used for FDM pilot symbols is a sub-set of all subbands used for the OFDM symbol. The subbands in each set may be uniformly distributed across the N total subbands and evenly spaced apart by $S_{fdm}=N/L_{fdm}$ subbands. For different OFDM symbol periods, different sets of subbands may be used such that adjacent OFDM symbols have different sets of subbands. Furthermore, the subbands in one set may be staggered or offset with respect to the subbands in the other set, so that the subbands in the two sets are interlaced with one another without overlapping. Thus, each set of mutually exclusive and non-overlapping subbands described above is commonly called "interlace." As an example, N=4096, $L_{fdm}$=512, $S_{fdm}$=8, so there would be eight interlaces per OFDM symbol and each interlace would consist of 512 subbands. In general, any number of interlaces (subband sets) may be used for the FDM pilots, and each set may contain any number of subbands of the N total subbands.

In one embodiment, a single interlace (consisting of 512 subbands, including guard subbands) is used for FDM pilots.

The wireless receiver 150 uses the FDM pilots for channel estimation, time tracking and/or possibly for frequency tracking. The wireless receiver may obtain an initial channel estimate based on the pilot-2 OFDM symbol 214. The wireless receiver may use the FDM pilots to increase the accuracy of the channel estimate within super-frames 204. The wireless receiver 150 may also use the FDM pilots to update the frequency tracking loop that can correct for frequency error in the received signal. The wireless receiver 150 may further use the FDM pilots (after being converted to time-domain channel estimate by the channel estimation unit 730) to update a time tracking loop and to place the FFT collection window 1012 at an offset according to the observed channel location and the delay spread (e.g., due to changes in the channel impulse response of the communication channel).

For the embodiment shown in FIG. 8, the FDM pilots are sent with an interleave of eight such that each eight subbands include seven data symbols and one FDM pilot symbol. The location of the interleaved FDM pilots are staggered from one OFDM symbol to the next OFDM symbol in this embodiment. If pilots are placed on interlace 2 for OFDM symbol period m, they will be placed on interlace 6 in OFDM symbol m+1.

Staggering allows channel estimation to use two times the actual FDM pilot subbands for converting them into the time-domain channel impulse response. The channel estimation block assumes that the conditions (channel, etc.) are stationary across consecutive OFDM symbols. Channel observations are combined from OFDM symbol m−1 with FDM pilots on interlace 6 with those from OFDM symbol m with pilots on interlace 2 and OFDM symbol m+1 back on interlace 6. Through this process, an effect is created like there are FDM pilots on both interlaces 2 and 6 for a total of two times the actual number of FDM pilots. For example, where there are 512 FDM pilots for a given OFDM symbol period, the channel estimation block 730 doubles those using adjacent OFDM symbol periods to have 512 actual FDM pilots and 512 fictitious FDM pilots.

Figure 9A:
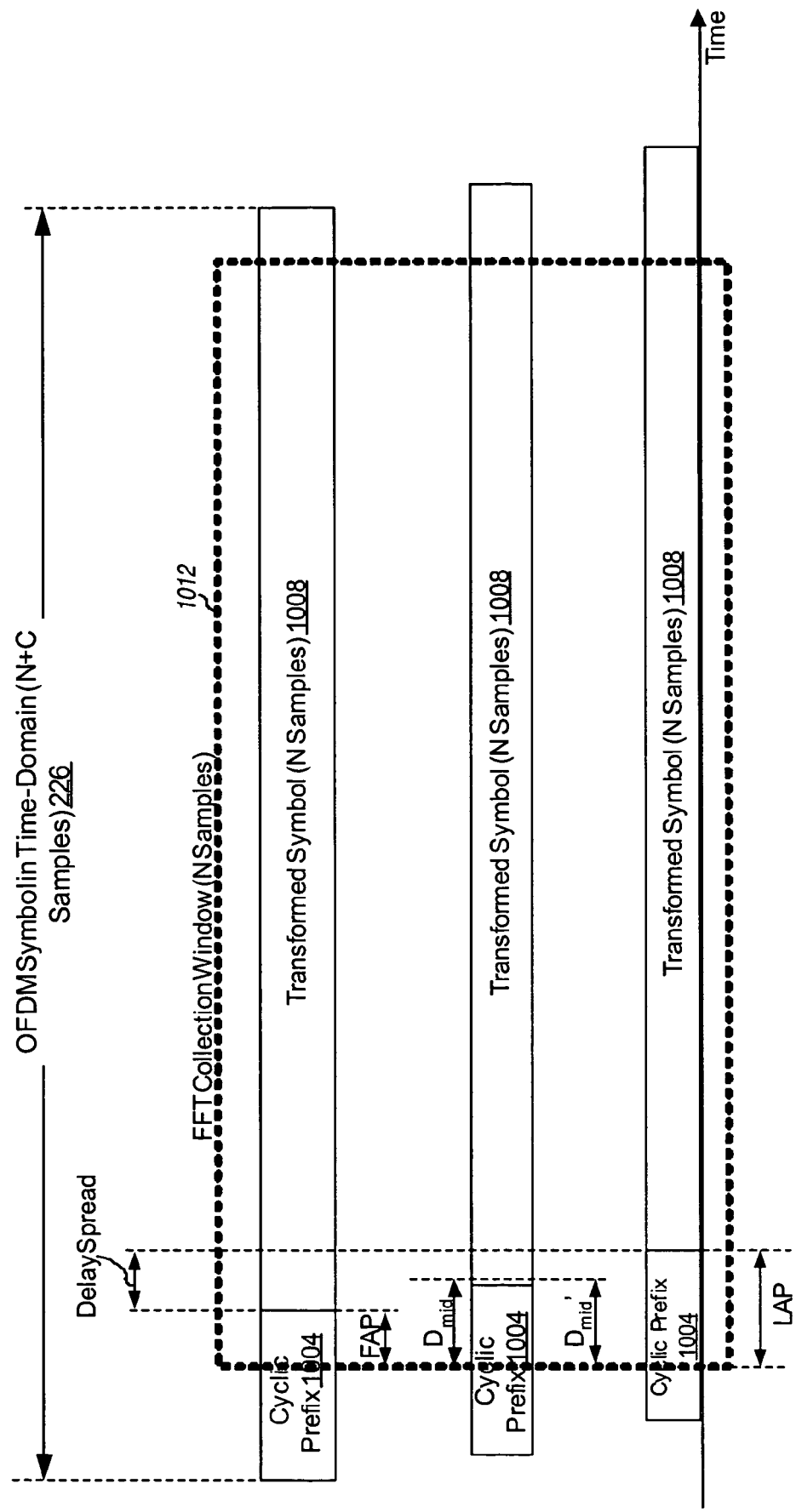
FIGS. 9A, 9B and 9C are block diagrams of embodiments showing three received signal paths for an OFDM symbol with differing delay spreads.
Figure 9B:
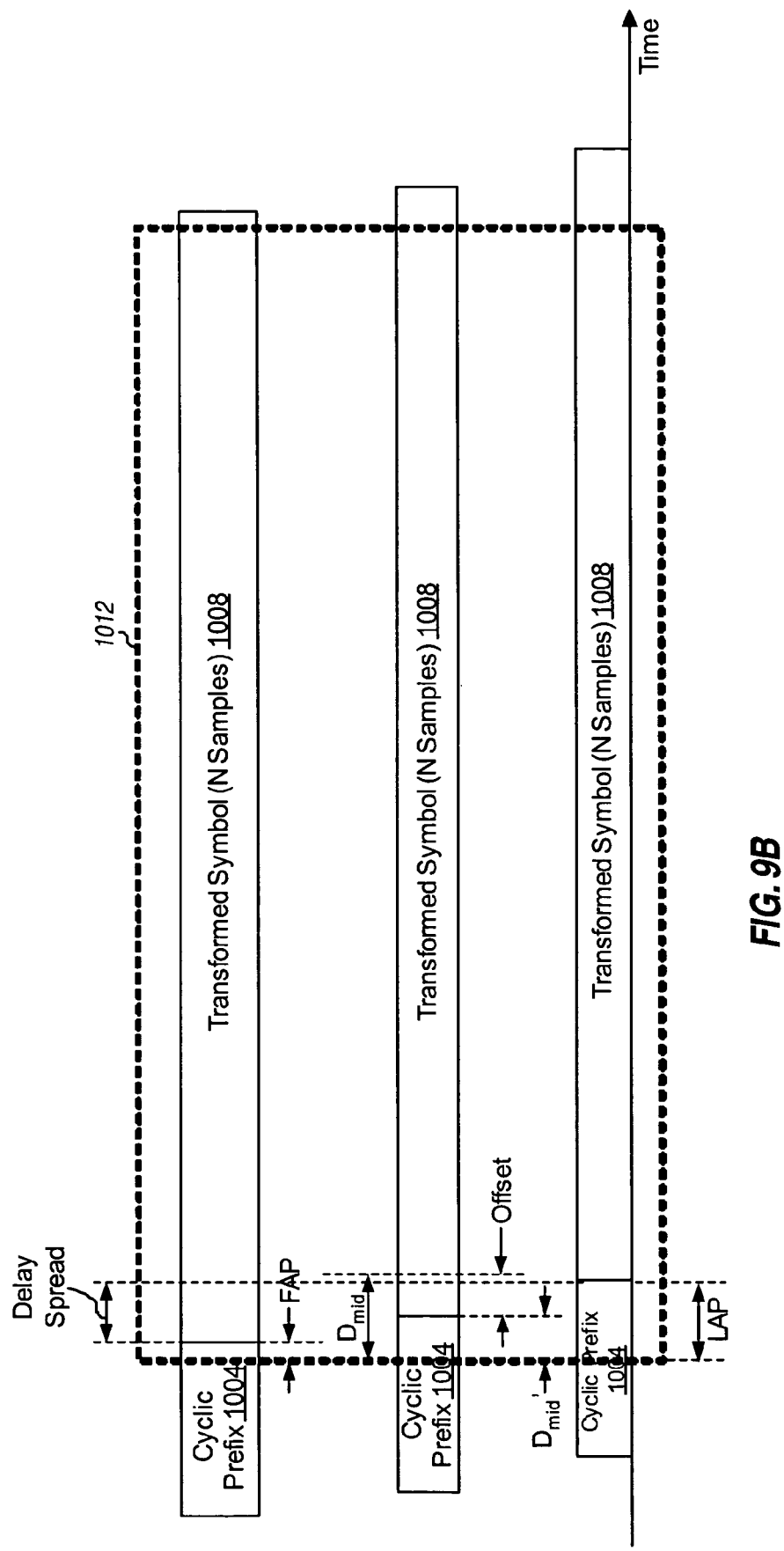
Figure 9C:
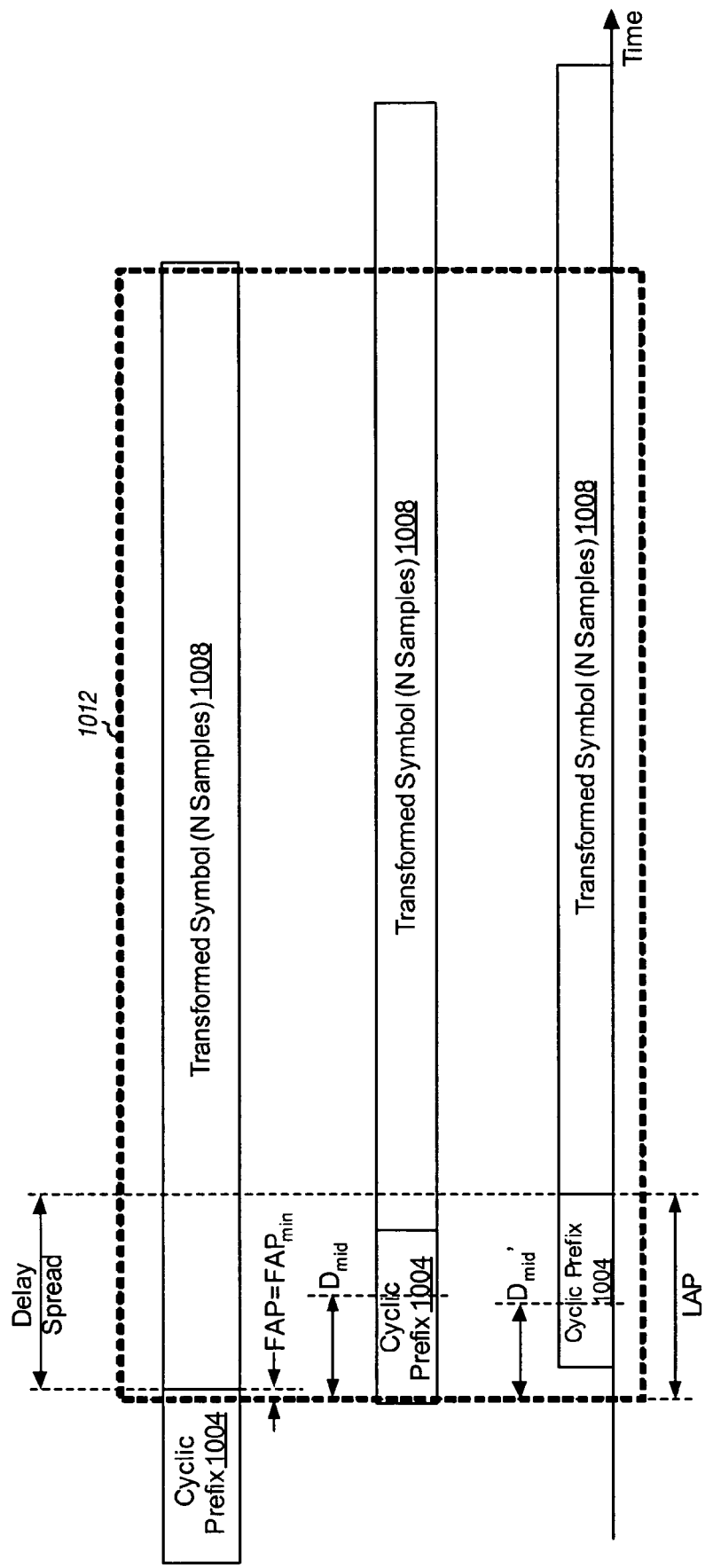

Referring next to FIGS. 9A, 9B and 9C, embodiments showing three received signal paths for an OFDM symbol under differing delay spreads are shown. Each OFDM symbol includes a cyclic prefix 1004 of C samples and a transformed symbol 1008 of N samples. The OFDM symbol is shown received on three paths, where each path has a different magnitude and time shift in this embodiment. Paths with OFDM symbols below a predetermined magnitude could be ignored in some embodiments. For example, there could be far more than the three paths shown FIG. 9A, but the lower magnitude paths are ignored when characterizing the channel location.

The difference between the FAP and LAP is the delay spread, D. In one embodiment, the cyclic prefix 1004 is 512 samples long and the delay spread is 490 chips, for example. $D_{mid}$ is placed relative to the FFT collection window 1012 and is determined by analyzing FAP, LAP and/or delay spread. $D_{mid}$ is the distance between the beginning of the FFT collection window 1012 for the present OFDM symbol and the desired middle of the channel for the next OFDM symbol. The offset is used to adjust the location of a collection window 1012 of N samples (e.g., 4096 samples) between the present OFDM symbol and the next OFDM symbol. The collection window 1012 defines a relevant portion of the incoming signal that is converted to the frequency domain by a FFT 514, for example.

The collection window 1012 is placed to capture the portion of the signal encapsulating the most useful energy. As described below, at least two of the FAP, LAP and delay spread are determined in order to characterize the channel location. The FAP, LAP and delay spread could be current measurements, measurements averaged over time and/or worst case measurements. To place the collection window 1012, a beginning of the collection window 1012 can be placed such that the following channel estimates are centered around the value $D_{mid}$, which is programmable. In one embodiment, $D_{mid}$ is set to a value about half of the length of the cyclic prefix 1004 (i.e., 256 samples into the cyclic prefix of length 512 samples) and measured from the beginning of the collection window 1012.

In the embodiments of FIGS. 9A, 9B and 9C, $D_{mid}$ is placed in the middle of the delay spread for the next OFDM symbol and the collection window is placed relative to $D_{mid}$. So long as the delay spread, D, is less than the length of the cyclic prefix 1004 as is the case in FIGS. 9A and 9B, all the signal energy collected inside the FFT window corresponds to the desired OFDM symbol and can be combined constructively for data demodulation. In contrast, the delay spread in FIG. 9C does not allow all the energy collected inside the FFT window to come from the desired OFDM symbol because of the large delay spread. In the embodiments of FIGS. 9A and 9B, the collection window 1012 is placed at a predetermined location relative to $D_{mid}'$, but the collection window 1012 is placed at a $FAP_{min}$ in the embodiment of FIG. 9C.

FAP distance is a measurement between the beginning of the FFT collection window 1012 and an end of the cyclic prefix 1004 for a first path. LAP distance is a measurement between the beginning of the FFT collection window 1012 and an end of the cyclic prefix 1004 for a last path. $D_{mid}'$ is the desired location for $D_{mid}$ for the current OFDM symbol. $D_{mid}$ is the desired location of $D_{mid}'$ during the next OFDM symbol. $D_{mid}$ is placed somewhere between FAP and LAP or at a mid-point between FAP and LAP in one embodiment. In other words, $D_{mid}'$ becomes $D_{mid}$ in the next OFDM symbol period. As the channel conditions are not changing in FIG. 9A, $D_{mid}'$ and $D_{mid}$ generally correspond with each other.

FIGS. 9A and 9B show examples of where the collection window 1012 can be placed to capture the useful signal energy for an OFDM symbol. In both of these cases, the delay spread is less than the size of the cyclic prefix 1004. Under these circumstances, the beginning of the collection window 1012 is placed within the intersection of the cyclic prefixes of all arriving paths, which correspond to the OFDM symbol of interest. The intersection is defined as the period in time where the signal paths, which may be screened to exclude weak paths, each are receiving a cyclic prefix for the same OFDM symbol. In other words, the intersection begins at the start of the cyclic prefix for the LAP and stops with the end of the cyclic prefix 1004 for the FAP. In one embodiment, the collection window 1012 is placed in the middle of this intersection, as long as the intersection of the cyclic prefixes corresponding to the first and the last arriving paths is a non-empty set. The FFT collection window 1012 is in general placed in such way that the following (future) channel estimates appear centered around $D_{mid}$, which may change as $D_{mid}'$ varies from $D_{mid}$. In an iterative way, $D_{mid}'$ is corrected with an offset where $D_{mid}'$ varies from $D_{mid}$.

In FIG. 9A, the channel location is not changing such that $D_{mid}'$ and $D_{mid}$ generally correspond with each other. But in FIG. 9B, that is not the case as there is an Offset between $D_{mid}$ and $D_{mid}'$. The difference between FIG. 9A and FIG. 9B is that the collection window 1012 has shifted to the right relative to the channel location such that $D_{mid}$ no longer coincides with $D_{mid}^1$. This Offset is relayed from the time tracker 520 to the time filter 528 such that adjustments can be made to the location of the collection window 1012 for the next OFDM symbol. The collection window 1012 for the next symbol is moved to the left and away from $D_{mid}$ and toward $D_{mid}^1$ as they existed for the present OFDM symbol. In this way, the beginning of the collection window 1012 can be maintained at an intersection of the cyclic prefixes 1004 for all paths of interest.

When the delay spread exceeds the length of the cyclic prefix 1004, as is the case in FIG. 9C, avoiding paths from other OFDM symbols being part of the collection window 1012 is no longer possible. In these cases, the collection window 1012 is placed at a minimum FAP distance, $FAP_{min}$, prior to the estimated end of the cyclic prefix 1004 corresponding to the FAP of the present OFDM symbol. One or more past OFDM symbols are used to predict where the cyclic prefix 1004 will end for the present OFDM symbol. In one embodiment, the $FAP_{min}$ is 24 samples for a cyclic prefix 1004 of 512 samples. In other embodiments, the $FAP_{min}$ could be about 0%, 1%, 2%, 3%, 4%, 5%, 6%, 7%, 8%, 9% or 10% of a length of the cyclic prefix 1004.

With reference to FIGS. 10A and 10B, diagrams demonstrate the processing of channel tap energies to determine cumulative energies. In FIG. 10A, a detection window 1016 moves across the impulse response tap energies to accumulate the energy within the detection window 1016. In this embodiment, the tap energies are subjected to the short-term average block 908 and/or the long-term average block 912 such that the trend FAP and LAP and/or instantaneous FAP and LAP could be determined using various techniques including the sliding detection window 1016 and other steps described below.

As shown in FIG. 10B, the accumulated energy curve 1050 is formed with the accumulated energy in the detection window 1016 as the detection window 1016 passes through the channel profile 1030 in FIG. 10A. From the accumulated energy curve 1050, the delay spread, FAP and LAP can be determined. By knowing any two of delay spread, FAP or LAP, the missing one can be determined. A vector of channel tap energies is used as the input to the DMTT algorithm, evaluated at $N_C$=1024 points in this embodiment. However, this need not be the case in other embodiments. If the resolution of the DMTT algorithm is reduced, all lengths and dimensions described herein may be scaled down appropriately. This is achieved by combining the energies from several neighboring taps of a $N_C$=1024–long channel estimate to arrive at the lower-resolution (shorter) channel estimate. In another embodiment, eight neighboring taps can be combined and the lower resolution $N_{C1}$=128, for example.

The tracking ability or the resolution of a time tracking algorithm often depends on the length of the channel estimate, namely $N_C$. If all $N_C$=4096 time-domain taps of the circular convolution channel are available, time tracking resolution is generally at its maximum. In this case, it is possible to uniquely determine what is the amount of the introduced shift in the FFT collection window 1012 position relative to the OFDM symbol boundaries. In most practical situations, however, the length of the channel estimates is limited by the number of FDM sub-carriers used for channel estimation. With a (2,6) pilot staggering pattern in place as shown in FIG. 8, for example, the number of available time-domain channel taps is $N_C$=1024 after zero extrapolation and interpolation of the 500 useful FDM subcarriers in an OFDM symbol as well as averaging channel observations across OFDM symbols. Staggering pilots increases the resolution of channel estimates, for example, in one embodiment $L_{fdm}$=512 pilots per OFDM symbol, yet $N_C$=1024 channel taps (also per OFDM symbol) as described above.

Figure 11:
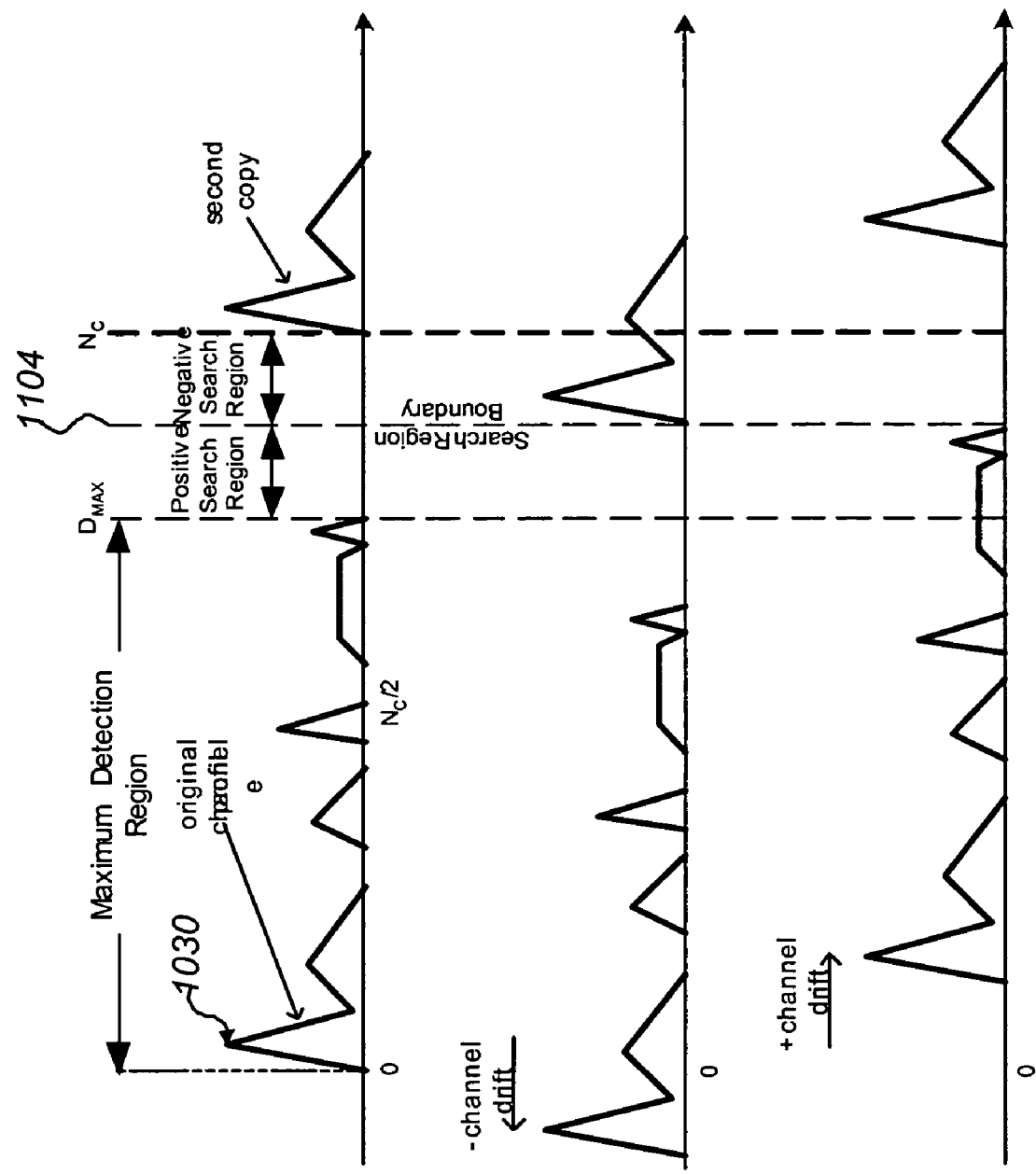
FIG. 11 is a diagram of an embodiment showing the effect of timing drifts on the resulting channel tap energies.

The time tracking ability in this embodiment depends on the actual time tracking algorithm implemented. In one embodiment, the algorithm uses the information about the channel placement in the past in order to increase the ability to detect channel changes. Assuming that the maximum non-zero delay spread of the channel is $D_{MAX}$, where no further knowledge about the channel is available, ambiguities in channel placement cannot be resolved, as soon as $D_{MAX}$>$N_C$/2. However, after assuming that the FAP and LAP information was correctly evaluated in the past, the absolute tracking ability extends to a total of $N_C$–$D_{MAX}$ positions. In other words, assume that the channel is equally likely to change its position in both directions (i.e., that the channel content is equally likely to occur before and after the current timing reference). Then, the channel location in the future may be by as much as ±($N_C$–$D_{MAX}$)/2 chips away from the current timing reference. This is shown in FIG. 11 where a diagram shows the effect of timing drifts on the resulting channel tap energies.

One factor in the tracking ability is the estimated delay spread of the channel D, rather than $D_{MAX}$. When the information on the channel delay spread is available, the total number of feasible channel locations increases to $N_C$–D in one embodiment. The delay spread estimation, D, as well as resistance of the algorithm to delay spreads longer than $N_C$/2 taps may lead to the modification of a FAP detection method. For notational convenience, we introduce the terminology of the "positive search region" or the "negative search region"—both are shown in FIG. 11. The positive search region is a portion of the region outside the non-zero channel content (i.e., the region between 0 and $D_{MAX}$ in FIG. 11) where it is assumed that the late channel content can potentially appear. Similarly, paths that are detected in the negative search region are assumed to have traveled a shorter distance than the previously observed channel content, and thus have appeared "earlier" in time. Introducing search regions with respect to the previous channel content introduces memory (or causality) that makes it possible to increase tracking ability of the DMTT. The decisions leading to the placement of the detected channel content within the maximum detection region, as well as to the placement of a boundary 1104 between the two search regions are explained next.

Timing synchronization is based on channel estimates and the values in the accumulated energy curve 1050. Consider the channel profile 1030 used for timing synchronization, shown in FIG. 10A. It is possible that the channel energies will be grouped into bins, in which case the channel profile 1030 is coarser, and $N_C$ in FIG. 10A is reduced. For the reasons of clarity in the following, we always assume $N_C$=1024, and explicitly introduce a length reduction factor $2^m$, as needed. The timing search algorithm is performed on the long-term and/or short-term averaged channel estimate energies as described in relation to FIG. 6. In the process of temporal averaging, one bin at the time, bin with the maximum channel energy, namely $n_{MAX}$ in FIG. 10A, is identified. Also, the maximum energy $$E_{MAX} = \max_{0 \le n < N_C} |h(n)|^2$$

is stored. This $E_{MAX}$ value is used in order to determine the threshold value $T_{DMTT}$ used for noise thresholding, aimed at removing the artificial taps in the channel estimate which do not correspond to real channel content.

Referring to FIG. 10B, the accumulated energy curve 1050 produced by sliding of the energy detection window 1016 through the channel profile 1030 is shown. The example in FIGS. 10A and 10B serves to point to the characteristic features of the method. The detection window length, $N_W$, is chosen so that the complete channel profile 1030 can fit into the detection window 1016. Therefore, $N_W \geq D_{MAX}$, and $N_W$=768 samples is chosen for this embodiment where the channel impulse response length ($N_C$) is 1024 samples, but could be other sizes in other embodiments. The detection window 1016 starting position for which the complete channel energy (or its vast majority) is included form a relatively flat zone 1040 of the accumulated energy curve 1050. The length of the flat zone 1040 is $N_W$–D and presumed to be positive in duration, where D is the actual channel delay spread. By estimating the boundaries of the flat zone 1040, it is possible to determine the location of the channel energy of interest within the $N_C$-long channel estimate and the channel delay spread, D. The flat zone 1040 is defined as a contiguous portion of the accumulated energy curve 1050 where the curve 1050 is within a predetermined range from the curve's 1050 maximum.

In FIG. 10B, channel location is identified by the presence of the FAP and the LAP. Once FAP and D in the current channel estimate are known, the timing correction or offset to be introduced to the future FFT collection window 1012 is such that the channel in future OFDM symbols is centered around some pre-determined position $D_{mid}$ within the maximum detection region, $D_{MAX}$. If a goal is to minimize the probability of early paths appearing before the maximum detection region, while keeping the effective channel delay spread low, $D_{mid}$ is chosen as $D_{MAX}/2$. In general, the chosen value for $D_{mid}$ depends on the deployment area and is kept programmable. The resulting timing offset can be calculated as:

$$\text{offset} = FAP + \left(\frac{D}{2} - D_{mid}\right). \quad (1)$$

Note that the second term in Equation (1) corresponds to the variable back-off that depends on the estimated "headroom" between the maximum allowed channel length and currently estimated channel length, as well as on the best placement of the channel considering the robustness issues in future OFDM symbols. In other words, Equation (1) for computing the timing offset to be applied in the FFT collection window 1012 results in moving the time-domain channel content to be centered around point $D_{mid}$ in future OFDM symbols. Any offset calculated moves the collection window 1012, once it reaches the roll-over value 4625 in this embodiment. The above procedure applies to a single instance of a timing decision.

The timing decisions can be done independently in hardware (HW) and/or software (SW) in other embodiments, where HW decisions are based on short-term averaged or instantaneous channel estimates and SW decisions are based on long-term averaged or trend channel estimates. Other embodiments could use SW or HW interchangeably to perform the short- or long-term averages. Each decision instances (HW and SW) then make the decisions on the channel location, i.e., FAP and LAP. These decisions can then be combined in one embodiment of the channel locator block 924 so that $$FAP = \min(FAP_{HW}, FAP_{SW}) \text{ and } LAP = \max(LAP_{HW}, LAP_{SW}). \quad (2)$$

Values from Equation (2) can be used as long as LAP–FAP$\leq D_{MAX}$. If the condition is violated, fast filter instantaneous values have the priority over the slow filter trend ones. In other words, if LAP–FAP>$D_{MAX}$, then:

$$\text{If } FAP_{HW} < FAP_{SW} \Rightarrow FAP_{SW} := FAP = FAP_{HW}, LAP_{SW} := LAP = FAP + D_{MAX};$$

$$\text{If } LAP_{HW} > LAP_{SW} \Rightarrow LAP_{SW} := LAP = LAP_{HW}, FAP_{SW} := FAP = LAP - D_{MAX}. \quad (3)$$

The only remaining situation: $LAP_{HW} - FAP_{HW} > D_{MAX}$, or $LAP_{SW} - FAP_{SW} > D_{MAX}$ is treated as described below. Parameter D used in Equation (1) can be found as D:=LAP–FAP.

Next, the actual algorithm for computing FAP and LAP is described for one embodiment. The input to the algorithm is a vector of averaged channel energies $|h(n)|^2$ in $N_C/2^m$ bins, where m can take values between 0 and $m_{max}$ ($m_{max}$=2 or 3 in some embodiments). The energies are averaged, but before being used in the timing synchronization block, channel taps are culled if below a threshold, which is a programmable value $T_{DMTT}$. The outputs of the algorithm are two integers, namely, FAP and LAP. Note that the following algorithm in the below listed steps can be applied independently in HW and/or SW in some embodiments, and the results can be combined. Two variants of the FAP/LAP detection algorithm are described: single-pass and two-pass algorithms. Single-pass algorithm requires slightly less time for computation, but in one embodiment is slightly more complicated in terms of implementation logic. Two-pass algorithm is much more straight forward to implement and can be used whenever computation time is not the tightest resource.

Single-Pass Enhanced DMTT Algorithm

Figure 12:
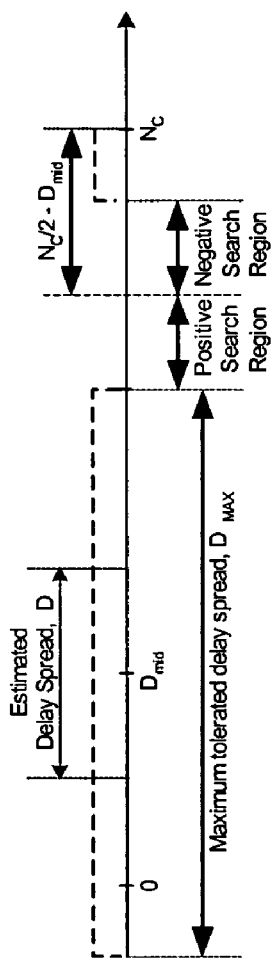
FIG. 12 is a diagram of an embodiment showing search windows for a programmable channel placement.

1. "Unwrap" the channel profile 1030 to distinguishing the two regions—positive and negative search region as shown in FIGS. 11 and 12. The boundary point 1104 between the negative and positive search regions is another programmable parameter in some embodiments. Assuming that the new signal paths are equally likely to appear before or after the currently detected channel content, the boundary point 1104 (from the end of the channel estimate) is chosen such that the regions are of equal length; in other words, $\Delta_N = (N_C/2 - D_{mid})2^m$. Thus, after thresholding by $T_{DMTT}$ we have:

$$e(n) = |h(N_C/2^m - \Delta_N + n)|^2, \text{ for } 0 \leq n < \Delta_N; \text{ and } e(n) = |h(n - \Delta_N)|^2, \text{ for } \Delta_N \leq n < N_C/2^m.$$

Conceptually, unwrapped channel estimate is then zero-padded on both sides in order to ensure that both rising and trailing edges of the flat region demonstrated in FIG. 10B are detected by sliding the detection window 1016 of length $N_W$ as implemented as described below.

2. Set initial values: $N_W = D_{MAX}/2^m$, n=0, $E_u$=0, two steps with different resolutions $\delta_E = E_{MAX}/\gamma$, $\Delta_E = N_\gamma \cdot \delta_E$ (programmable parameters $\gamma$ and $N_\gamma$); set three forward and one backward threshold $E_{TF0} = E_{MAX} - 2\Delta_E$, $E_{TF1} = E_{MAX} - \Delta_E$, $E_{TF,end} = E_{TF1} - \delta_E$, and $E_{TB} = E_{TF,end}$; set the binary flags found$_{beg}$=false, found$_{end}$=false; initialize the buffer of leading edge positions $BEG_{buff}$ to all-zeros of length $N_\gamma$.

3. For $0 \leq n < N_W$, do the following in a single-pass algorithm:
   a) $E_n = E_n + e(n)$; recall that $$E_n = \left( \sum_{k=n-N_W+1}^{n} e(n) \right)$$

and $e(n)$ is preceded by zeros.
   b) If ($E_n > E_{TF0}$ and $E_n > E_{TF1}$), value exceeded the thresholds by significant amount: buffer $BEG_{buff}$ is filled with value n ($N_\gamma$ times) in this embodiment.
   c) Else, if ($E_n > E_{TF0}$, but $E_n \leq E_{TF1}$), value just exceeded the threshold, shift the current position n once into the buffer $BEG_{buff}$. In both cases (b) and (c) do the following: $E_{TF0} = E_n + \delta_E$, $E_{TF1} = E_{TF0} + \Delta_E$, $E_{TB} = E_n - \Delta_E$, $found_{beg} = true$.
   d) Else if ($found_{beg} = true$, $found_{end} = false$ and $E_n < E_{TB}$), do: END=n, $found_{end} = true$, $E_{TF,end} = E_{TB} + \delta_E$.
   e) Else if ($found_{end} = true$ and $E_n > E_{TF,end}$), do: $found_{end} = false$.
4. For $N_W \leq n < N_C/2^m$, do the following: $[E_n = E_n - e(n - N_W) + e(n)$; then repeat the steps (b)-(e) above].
5. While $found_{end} = false$, do the following: [n=n+1, $E_n = E_n - e(n - N_W)$, then also do step (d)].

Finally, the output parameters tied to the channel location and delay spread are obtained as:

$$LAP = 2^m \cdot (BEG_{buff}[0] - \Delta N), \quad FAP = 2^m \cdot (END - \Delta_N - N_W). \quad (4)$$

The algorithm described in steps 1-5 above has some or all of the following properties:

Using the small fine step $\delta_E$ and the corresponding value $N_\gamma$ (chosen as a power of two) in order to construct the effective step for the algorithm, $\Delta_E$ is beneficial since small values $\delta_E$ help determine the absolute maximum of the accumulated energy profile with higher accuracy. The buffer for the leading edge position $BEG_{buff}$ serves to effectively backtrack from the maximum position by roughly $\Delta_E$ and declare that point to be the leading edge. The actual backtrack amount may depend on several factors.

The algorithm places the estimated leading edge beg=$BEG_{buff}[0]$ no later than the real beginning of the flat zone 1040 and the estimated trailing edge END no sooner than the real end of the flat zone 1040 as long as $\Delta_E$ 1060 is greater than the maximum peak-to-peak ripple of $E_n$ in the flat zone 1040. The resulting flat zone 1040 can be wider than the real flat zone 1040. However, under most realistic scenarios, the leading edge is declared anywhere between $\Delta_E$ and $2\Delta_E$ from the actual maximum point, while trailing edge comes approximately $\Delta_E$ 1060 below the maximum.

Some of the trade-off for values $\gamma$ and $N_\gamma$ include: large values are preferred from the accuracy point of view. When $\gamma$ and correspondingly $N_\gamma$ trend toward infinity, maximum of the accumulated energy $\max_n E_n$ is determined more precisely. With increased $N_\gamma$ the ambiguity for back-tracking from the maximum (to determine the leading edge position) also increases. In one embodiment, values are chosen as $\gamma = 256$ and $N_\gamma = 8$. These values are kept programmable in some embodiments.

Related to $\gamma$ and $N_\gamma$ is the value of the threshold $T_{DMTT}$. Thresholding is introduced in the symbol timing detection or DMTT block 720 to take advantage of the coherent combining gain of temporal channel estimation averaging. Thresholding removes the positive bias (positive incline in the accumulated energy curve 1050) visible in step 3 above due to zero-padding. The threshold is not larger than the resulting equivalent step $\Delta_E$, and is kept programmable in terms of the multiple of fine steps $\delta_E$, $N_{th}$. In one embodiment the value chosen is $N_{th} = 4$, so that $T_{DMTT} = E_{MAX}/64$.

Overall, the appropriate value for $\gamma$, $N_\gamma$ and $N_{th}$, as well as $2^m$ may be empirically or algorithmically, but are kept in programmable registers. Moreover, it is possible to keep the AGC setpoint as the reference value instead of $E_{MAX}$.

As described previously in above, and in Equation (3), alternative handling may be applied when a certain discrepancy in the timing decisions using slow- and fast-averaged channel estimates 908, 912 is detected. A similar precaution applies in the unlikely scenario that the individual (HW or SW) timing search algorithm described above returns an unexpected result, for example, LAP−FAP>$D_{MAX}$. Regardless of the estimated leading and trailing edge position, values for FAP and LAP are limited in separation by less than $D_{MAX}$ in embodiments. However, to avoid performance degradation resulting from erroneous timing, it is advisable to set the HW in place which will detect the LAP−FAP>$D_{MAX}$ situation and set FAP=$D_{MAX} - N_C$, LAP=$2D_{MAX} - N_C$ in this case.

Using the algorithms described above, channel parameters for short-averaged (HW) and long-averaged (SW) channel estimates can be obtained. The final result of the corresponding algorithms: namely $FAP_{HW}$, $LAP_{HW}$, $FAP_{SW}$, $LAP_{SW}$, are then combined and used for OFDM sample counter modification as explained earlier in Equations (2) and (3) to position the collection window 1012.

Two-Pass Enhanced DMTT Algorithm

Given the fast filter-averaged channel estimates $A_n(k)$, information about the FAP and LAP can be extracted using either a single-pass or a two-pass DMTT algorithm. While the single pass algorithm offers the benefit of faster processing time, the associated logic and HW resources can be more demanding.

Averaged channel estimates contained in $A_n(k)$ are aligned according to the previously best-known timing, including a variable back-off, which depends on the estimated length of the useful channel content. The averaged channel estimates are also unthresholded in this embodiment. One goal of the DMTT algorithm is to re-evaluate the beginning and ending of the nonzero channel content in the estimate $A_n(k)$, and use this information to update the FFT collection window 1012 placement in the future OFDM symbols, so as to establish desired performance as well as robustness to changing channel conditions. This re-evaluation (timing estimation) is performed once every $N_{ud}$ OFDM symbols and comprises of the following operations:

1. Defining the break-point separating the "future" from the "past" in the averaged channel estimate. Due to a finite number of staggered pilots (channel estimates span only 1024 time-domain chips in this embodiment), a hard decision is made as to where in the channel estimate is the starting position (position of minimum time). The estimate is than re-ordered in the order of increasing time.
2. Thresholding the channel estimate according to a threshold chosen as a fraction of the maximum time-domain tap $E_{MAX}$. Unthresholded channel estimates are averaged in HW so that non-coherent combining of the noise taps can lead to SNR gains of the channel estimate. In order to take advantage of this gain, thresholding is applied in DMTT block 720.
3. Compute the accumulated energy curve 1050 by sliding the rectangular detection window 1016 of size $N_W$ over the thresholded channel estimate. Find the maximum of the accumulated energy profile. Based on pre-set forward and backward thresholding coefficients $\epsilon_f$ and $\epsilon_b$, compute the forward and backward thresholds for determining the flat zone edges:

$$E_{T,F}=E_{n,MAX}(1-\epsilon_f), E_{T,B}=E_{n,MAX}(1-\epsilon_b).$$

4. Starting from the point $n_{MAX}$ corresponding to $E_{n,MAX}$, and moving towards the edges of the accumulated energy profile, determine the furthest points where energy crosses the forward and backward thresholds. In one embodiment, the forward and backward thresholds are 5%, 10%, 15%, or 20% of $E_{n,MAX}$. These points determine the ending and beginning (respectively) of the flat zone 1040. Using these points, it is straightforward to compute the estimated beginning and end (FAP and LAP) of the nonzero channel content.

The inputs to the Enhanced DMTT unit are the N values $A_n(k)$, the maximum value of $A_n(k)$, namely $E_{MAX}$, which can be determined by the block for averaging, and the "DMTT update request signal" generated by the FFT block once every $N_{ud}$ OFDM symbols in a normal mode of operation. Other "inputs" are the SW-programmable parameters of the two-pass algorithm, given in Table 1 below.

TABLE 1

Programmable parameters, used by the two-pass DMTT algorithm, with default values.

| Programmable parameter | Description | Acceptable values |
|---|---|---|
| $N_W$ | Window length | Between $512/N_b$ and $768/N_b$ |
| $D_{mid}$ | Mid-point for centering channel estimates after timing corrections | Between $256/N_b$ and $384/N_b$ |
| $\Delta_N$ | Cut-off place for un-wrapping channel estimates | Nominal value is $512/N_b - D_{mid}$, but variation of $\pm 128/N_b$ is possible (by SW) |
| $\epsilon_f, \epsilon_b$ | Forward and backward threshold coefficients | 7-bit fractional values, between 0.02 and 0.1; nominal values: around 0.05, both |
| $\beta_T$ | Determines the noise-threshold $T_{DMTT} = E_{MAX}/\beta_T$ | Values range between 32, 128; one good candidate is 64 |

These parameters can be written by software, and while some of them will be kept constant throughout the modem operation, some of them might be adaptable on a frame-by-frame basis, depending on more sophisticated SW algorithms. Whenever the "DMTT update request signal" is set to high, and based on the other inputs, enhanced DMTT unit produces two outputs, namely the estimated beginning and end of the non-zero channel content; these are two integers: FAP and LAP. Additional programmable parameters include minimum back-off, $B_{off}$ and hard limit, offset$_{max}$.

During the initialization stage, the relevant variables and buffers are initialized. They are used in the following stages. First step is to define the notion of the beginning and end of the channel estimate energy profile contained in the buffer $A_n(k)$ (also called $A_n$), of length $N=1024/N_b$. The starting point in this buffer for the purpose of energy accumulation is defined as $N-\Delta_N$, while the last point is $N-\Delta_N-1$; note that the indices increase modulo N. The addresses of the memory locations are defined: startIndex=endIndex=$N-\Delta_N$, and the breaking point location: breakPt=$[N-\Delta_N+N_W]_{mod\,N}$. The accumulated energy $E_n$ is a 12-bit unsigned value (scaling $2^5$), which is initialized to zero in this embodiment. Also, the position counter n is initialized to zero (10 bits), and so are the values BEG and END, containing the leading and trailing edge position respectively (10 bits each). Based on the maximum tap of the averaged channel estimate, $E_{MAX}$, the unsigned 8-bit threshold $T_{DMTT}=E_{MAX}/\beta_T$ is determined. The maximum accumulated energy value, $E_{n,MAX}$ and the corresponding position, $n_{MAX}$ are both initialized to zero. The memory is allocated for buffer of accumulated energies, $E_n$, which is $N+N_W$—long buffer containing 12-bit unsigned values. Finally, the binary flags are set: found$_{beg}$=false, found$_{end}$=false.

After initialization has taken place, the first pass of the DMTT algorithm is ready to begin. The outcome of this stage is computing the accumulated energies and locating their maximum.

For $0 \leq n < N$, do the following:
 f) $e=A_{endIndex}$; if $e>T_{DMTT}$, do: $E_n=E_n+e$ (saturate back to 12 bits); endIndex=[endIndex+1]$_{mod\,N}$;
 g) if endIndex>breakPt, do: $e=A_{startIndex}$; if $e>T_{DMTT}$, do: $E_n=E_n-e$ (keep at 12 bits); startIndex=[startIndex+1]$_{mod\,N}$; store $E_n$ in the appropriate location;
 h) if $E_n > E_{n,MAX}$, set $E_{n,MAX}=E_n$ and $n_{MAX}=n$.

For $N \leq n < N+N_W$, do: $e=A_{startIndex}$; if $e>T_{DMTT}$, do: $E_n=E_n-e$ (keep at 12 bits); startIndex=[startIndex+1]$_{mod\,N}$; store $E_n$ in the appropriate location;

After the first pass has been completed, use $E_{n,MAX}$ to set the forward and backward thresholds: $E_{T,F}=E_{n,MAX} \cdot (1-\epsilon_f)$, $E_{T,B}=E_{n,MAX} \cdot (1-\epsilon_b)$. The thresholds are kept as 12 bits unsigned.

The second pass includes two parts: backward search for finding the leading edge, BEG, and forward search for locating the trailing edge, END.

For $n_{MAX}-1 \geq n \geq 0$ (decreasing index), do the following: found$_{end}$=false
 a) if (found$_{beg}$=false, and $E_n<E_{T,B}$), do: BEG=n+1, found$_{beg}$=true;
 b) else if (found$_{beg}$=true, and $E_n \geq E_{T,B}$), do: found$_{beg}$=false.

For $n_{MAX}+1 \leq n < N+N_W$ (increasing index), do the following:
 a) if (found$_{end}$=false, and $E_n<E_{T,F}$), do: END=n, found$_{end}$=true;
 b) else if (found$_{end}$=true, and $E_n \geq E_{T,F}$), do: found$_{end}$=false.

At this point, both BEG and END should contain nonzero values, and both binary flags should be set to true. If this is not the case, timing offset value should not be modified. The output parameters FAP and LAP, tied to the channel location and the delay spread are found as:

$$LAP_{HW}=BEG-\Delta_N, FAP_{HW}=END-\Delta_N-N_W. \quad (5)$$

Alternative Communication Channel Location Algorithm

In addition to the methods mentioned above to determine FAP, another methods could be used in some embodiments. In one embodiment, the leading and trailing edges of the flat zone 1040 is found by scoring a weighted sum of the accumulated energy and its positive finite difference. The delay spread, D, can be determined after finding both the leading and trailing edges of the accumulated energy curve 1050. U.S. patent application Ser. No. _____, filed on the same date as the present application, entitled FINE TIMING ACQUISITION, which is hereby incorporated by reference, describes use of detecting spikes in the negative differential of the accumulated energy curve to determine trailing edges of the flat zone, which can also be used to find the leading edge of the flat zone. Once these edges are found, the delay spread can be determined according to the above description. After finding these communication channel location parameters, they can be used in the channel estimation unit 720 and/or placement of the collection window 1012 as described above.

Figure 13:
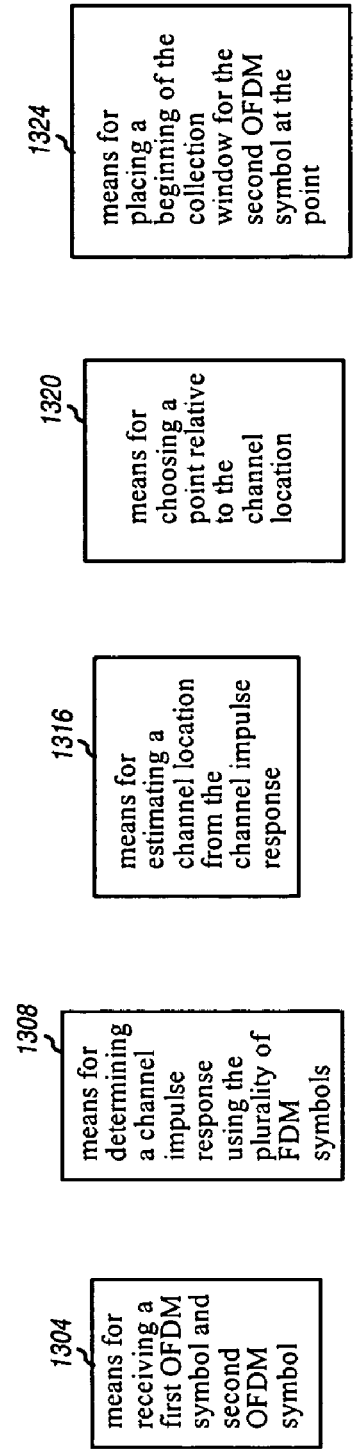
FIG. 13 is a block diagram of an embodiment a portion of a receiver.

Referring next to FIG. 13, an embodiment of a receiver 1300 for positioning a collection window for a Fourier transform function analyzing a multi-carrier communication signal is disclosed. The receiver includes: means for receiving 1304 a first OFDM symbol and second OFDM symbol; means for determining 1308 a channel impulse response using the plurality of FDM symbols; means for estimating 1316 a channel location from the channel impulse response, wherein the channel location is characterized by at least two of delay spread, FAP or LAP; means for choosing 1320 a point relative to the channel location; and means for placing 1324 a beginning of the collection window for the second OFDM symbol at the point. The first OFDM symbol comprise a plurality of FDM symbols, and the first OFDM symbol is characterized by a FAP and a LAP. The point is chosen at a first location relative to the channel location using a first algorithm if a delay spread is less than a predetermined length. Alternatively, the point is chosen at a second location relative to the channel location using a second algorithm if the delay spread is greater than the predetermined length. The first and second algorithms are different, and the first and second locations are different.

Figure 14:
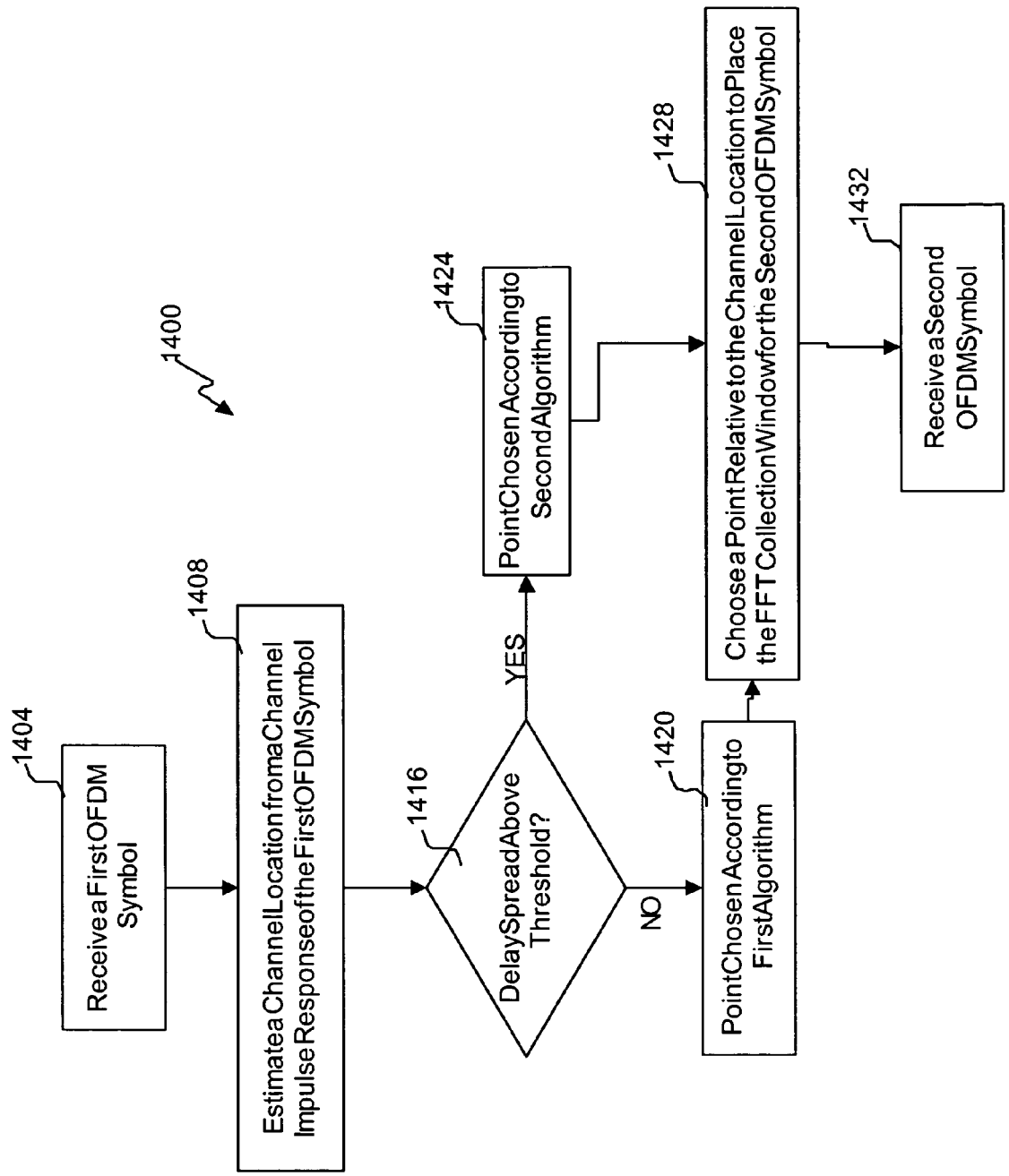
FIG. 14 is a flow diagram of an embodiment of a process to place the FFT collection window.

With reference to FIG. 14, an embodiment of a process 1400 for placing the FFT collection window 1012 for the Fourier transform function in the window placement unit 725 is disclosed. In blocks 1404 and 1432, a first orthogonal frequency division multiplexing (OFDM) symbol and second OFDM symbol are received in a sequential fashion. Analysis of the first OFDM symbol is used in capturing the second OFDM symbol. The first OFDM symbol includes a plurality of frequency division multiplexed (FDM) symbols. The channel location of the first OFDM symbol is characterized by at least two of a delay spread, a first arriving path (FAP) or a last arriving path (LAP). A channel location is estimated from a channel impulse response in block 1408. The point at which the FFT collection window 1012 is placed can be at two different positions according to the delay spread as determined in block 1416.

The point is chosen at a first location relative to the channel location using a first algorithm if a delay spread is less than a predetermined length in block 1420. The point is chosen at a second location relative to the channel location using a second algorithm if the delay spread is greater than the predetermined length in block 1424. The point relative to the channel location is selected in block 1428. A beginning of the FFT collection window 1012 is placed for the second OFDM symbol at the point in block 1432.

The synchronization techniques described herein may be implemented by various means. For example, these techniques may be implemented in hardware, software, or a combination thereof. For a hardware implementation, the processing units at a base station used to support synchronization (e.g., TX data and pilot processor 120) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units at a wireless receiver used to perform synchronization (e.g., SCEU 180) may also be implemented within one or more ASICs, DSPs, and so on.

Some of the above embodiments determine the leading and trailing edges of the flat zone in a particular way. Other embodiments could score a weighted sum of the tap energy and a finite difference from the maximum tap energy. The beginning and end of the flat zone could be determined with this type of scoring algorithm.

For a software implementation, the synchronization techniques may be implemented with modules (e.g., procedures, functions, and so on) that perform the functions described herein. The software codes may be stored in a memory unit (e.g., memory unit 192 in FIG. 1) and executed by a processor (e.g., controller 190). The memory unit may be implemented within the processor or external to the processor.

While the principles of the disclosure have been described above in connection with specific apparatuses and methods, it is to be clearly understood that this description is made only by way of example and not as limitation on the scope of the invention.

What is claimed is:

1. A method for communication, the method comprising:
  receiving, over a communication channel, a first orthogonal frequency division multiplexing (OFDM) symbol and a second OFDM symbol, wherein the first OFDM symbol comprises a cyclic prefix of a cyclic prefix length and a plurality of frequency division multiplexed (FDM) symbols and is characterized by a first arriving path (FAP) and a last arriving path (LAP), the FAP and the LAP being separated by a delay spread;
  estimating a channel location from a channel impulse response of the communication channel;
  choosing a point relative to the channel location; and
  placing a beginning of a Fourier transform function collection window for the second OFDM symbol at the point, wherein:
    the point is chosen at a first location relative to the channel location using a first algorithm if the delay spread is less than a predetermined length, and
    the point is chosen at a second location relative to the channel location using a second algorithm if the delay spread is greater than the predetermined length, the second algorithm being different from the first algorithm; and
  transforming the symbols to time-domain samples.

2. The method as recited in claim 1, wherein the second OFDM symbol comprises a cyclic prefix of the cyclic prefix length, and the predetermined length is substantially equal to the cyclic prefix length.

3. The method as recited in claim 2, wherein the first algorithm is such that the first location is at an intersection of cyclic prefixes corresponding to the LAP and the FAP of the first OFDM symbol.

4. The method as recited in claim 3, wherein the method is performed at a receiver, the method further comprising performing demodulation and detection on the first and second OFDM symbols to obtain estimates of data sent to the receiver.

5. The method as recited in claim 4, further comprising a step of determining the channel impulse response using the plurality of FDM symbols from the first OFDM symbol.

6. The method as recited in claim 4, wherein:
  the first location is chosen at a mid-point of the delay spread.

7. The method as recited in claim 4, wherein the second location is chosen such that the collection window begins a predetermined distance from an estimated end of the cyclic prefix corresponding to the FAP.

8. The method as recited in claim 7, wherein the predetermined distance is about 5% of the length of the cyclic prefix.

9. The method as recited in claim 4, wherein the predetermined length is less than the length of the cyclic prefix for the first OFDM symbol.

10. The method as recited in claim 4, wherein the predetermined length is greater than half of the length of the cyclic prefix for the first OFDM symbol.

11. The method as recited in claim 4, further comprising a step of culling channel taps from the channel impulse response that are below a predetermined threshold.

12. The method as recited in claim 4, wherein search regions are used in placement of the collection window for the second OFDM symbol.

13. The method as recited in claim 4, wherein the collection window is used to capture future channel estimates.

14. A communication device configured for placing a collection window for a Fourier transform function, the communication device comprising:
   a processor configured to:
      receive, over a communication channel, a first orthogonal frequency division multiplexing (OFDM) symbol and a second OFDM symbol, wherein the first OFDM symbol comprises a cyclic prefix of a cyclic prefix length and a plurality of frequency division multiplexed (FDM) symbols, and is characterized by a first arriving path (FAP) and a last arriving path (LAP), the FAP and the LAP being separated by a delay spread;
      estimate a channel location from a channel impulse response of the communication channel;
      choose a point relative to the channel location; and
      place a beginning of the collection window for the second OFDM symbol at the point, wherein:
         the point is chosen at a first location relative to the channel location using a first algorithm if the delay spread is less than a predetermined length, and
         the point is chosen at a second location relative to the channel location using a second algorithm if the delay spread is greater than the predetermined length, the second algorithm being different from the first algorithm; and
   a memory coupled to the processor.

15. The communication device as recited in claim 14, wherein:
   the processor is further configured to perform demodulation and detection on the first and second OFDM symbols to obtain estimates of data sent to the communication device, and the predetermined length is substantially equal to the length of the cyclic prefix.

16. The communication device as recited in claim 15, wherein the processor is further configured to determine the channel impulse response using the plurality of FDM symbols from the first OFDM symbol.

17. The communication device as recited in claim 15, wherein:
   the first location is chosen at a mid-point of the delay spread.

18. The communication device as recited in claim 15, wherein the second location is chosen such that the collection window begins a predetermined distance from an estimated end of the cyclic prefix corresponding to the FAP.

19. The communication device as recited in claim 18, wherein the predetermined distance is about 24 samples of the length of the cyclic prefix.

20. The communication device as recited in claim 15, wherein the processor is further configured to cull channel taps from the channel impulse response that are below a predetermined threshold.

21. The communication device as recited in claim 15, wherein the first location is within an intersection of cyclic prefixes for the FAP through the LAP.

22. The communication device as recited in claim 14, wherein the predetermined length is less that the length of the cyclic prefix for the first OFDM symbol.

23. The communication device as recited in claim 14, wherein the predetermined length is greater than half of the length of the cyclic prefix for the first OFDM symbol.

24. The communication device as recited in claim 14, wherein the first location is about mid-way through an intersection of cyclic prefixes for the FAP through the LAP.

25. A computer program product, comprising:
   non-transitory computer readable medium comprising:
      code for causing a computer to communicate wirelessly, comprising:
         receiving, over a communication channel, a first orthogonal frequency division multiplexing (OFDM) symbol and a second OFDM symbol, wherein the first OFDM symbol comprises a cyclic prefix of a cyclic prefix length and a plurality of frequency division multiplexed (FDM) symbols and is characterized by a first arriving path (FAP) and a last arriving path (LAP), the FAP and the LAP being separated by a delay spread;
         estimating a channel location from a channel impulse response of the communication channel;
         choosing a point relative to the channel location; and
         placing a beginning of a Fourier transform function collection window for the second OFDM symbol at the point, wherein:
            the point is chosen at a first location relative to the channel location using a first algorithm if the delay spread is less than a predetermined length, and
            the point is chosen at a second location relative to the channel location using a second algorithm if the delay spread is greater than the predetermined length, the second algorithm being different from the first algorithm.

26. The computer program product as recited in claim 25, the code for causing the computer to communicate wirelessly further comprising the second OFDM symbol comprising a cyclic prefix of the cyclic prefix length, and code for the predetermined length being substantially equal to the cyclic prefix length.

27. The computer program product as recited in claim 26, the code for causing the computer to communicate wirelessly further comprising the first algorithm being such that the first location is at an intersection of cyclic prefixes corresponding to the LAP and the FAP of the first OFDM symbol.

28. The computer program product as recited in claim 27, the code for causing the computer to communicate wirelessly further comprising performing demodulation and detection on the first and second OFDM symbols to obtain estimates of data sent to a receiver.

29. The computer program product as recited in claim 28, the code for causing the computer to communicate wirelessly further comprising determining the channel impulse response using the plurality of FDM symbols from the first OFDM symbol.

30. The computer program product as recited in claim 28, the code for causing the computer to communicate wirelessly further comprising the first location being chosen at a midpoint of the delay spread.

31. The computer program product as recited in claim 28, the code for causing the computer to communicate wirelessly further comprising the second location being chosen such that the collection window begins a predetermined distance from an estimated end of the cyclic prefix corresponding to the FAP.

32. The computer program product as recited in claim 31, the code for causing the computer to communicate wirelessly further comprising the predetermined distance being about 5% of the length of the cyclic prefix.

33. The computer program product as recited in claim 28, the code for causing the computer to communicate wirelessly further comprising the predetermined length being less than the length of the cyclic prefix for the first OFDM symbol.

34. The computer program product as recited in claim 28, the code for causing the computer to communicate wirelessly further comprising the predetermined length being greater than half of the length of the cyclic prefix for the first OFDM symbol.

35. The computer program product as recited in claim 28, the code for causing the computer to communicate wirelessly further comprising culling channel taps from the channel impulse response that are below a predetermined threshold.

36. The computer program product as recited in claim 28, the code for causing the computer to communicate wirelessly further comprising search regions to be used in placement of the collection window for the second OFDM symbol.

37. The computer program product as recited in claim 28, the code for causing the computer to communicate wirelessly further comprising the collection window to be used to capture future channel estimates.

* * * * *